United States Patent
Molin et al.

(10) Patent No.: US 10,089,538 B2
(45) Date of Patent: Oct. 2, 2018

(54) VEHICLE 360° SURROUND VIEW SYSTEM HAVING CORNER PLACED CAMERAS, AND SYSTEM AND METHOD FOR CALIBRATION THEREOF

(71) Applicant: BENDIX COMMERCIAL VEHICLE SYSTEMS LLC, Elyria, OH (US)

(72) Inventors: Hans M. Molin, Mission Viejo, CA (US); Marton Gyori, Budapest (HU); Andreas U. Kuehnle, Villa Park, CA (US); Zheng Li, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 352 days.

(21) Appl. No.: 14/683,212

(22) Filed: Apr. 10, 2015

(65) Prior Publication Data

US 2016/0300113 A1 Oct. 13, 2016

(51) Int. Cl.
*H04N 7/18* (2006.01)
*G06K 9/00* (2006.01)
(Continued)

(52) U.S. Cl.
CPC ............ *G06K 9/00805* (2013.01); *G06T 7/73* (2017.01); *G06T 7/80* (2017.01); *H04N 5/23229* (2013.01);
(Continued)

(58) Field of Classification Search
USPC ......................................................... 348/148
See application file for complete search history.

(56) References Cited

U.S. PATENT DOCUMENTS 6,044,181 A 3/2000 Szeliski
6,476,803 B1 * 11/2002 Zhang .................... G06T 15/00
345/419
(Continued)

FOREIGN PATENT DOCUMENTS

EP 2523163 A1 11/2012

OTHER PUBLICATIONS

International Search Report and Written Opinion from corresponding International Application No. PCT/US2016/026693, dated Jul. 8, 2016.
(Continued)

*Primary Examiner* — Leron Beck
(74) *Attorney, Agent, or Firm* — Tucker Ellis LLP

(57) ABSTRACT

Cameras having wide fields of view are placed at each of the front left, front right, rear left, and rear right corners of a nominally rectangular-shaped vehicle, thereby providing a continuous region of overlapping fields of view completely surrounding the vehicle, and enabling complete 360° stereoscopic vision detection around the vehicle. In an embodiment the regions of overlapping fields of view completely surround the vehicle. The cameras are first individually calibrated, then collectively calibrated considering errors in overlapping viewing areas to develop one or more calibration corrections according to an optimization method that adjusts imaging parameters including homography values for each of the cameras, to reduce the overall error in the 360° surround view image of the continuous region surrounding the vehicle.

18 Claims, 25 Drawing Sheets

(51) Int. Cl.
  *H04N 5/232* (2006.01)
  *H04N 5/247* (2006.01)
  *H04N 17/00* (2006.01)
  *G06T 7/80* (2017.01)
  *G06T 7/73* (2017.01)

(52) U.S. Cl.
  CPC ........... *H04N 5/247* (2013.01); *H04N 17/002* (2013.01); *G06T 2207/10004* (2013.01); *G06T 2207/30252* (2013.01); *G06T 2207/30261* (2013.01)

(56) References Cited

U.S. PATENT DOCUMENTS

| | | | |
|---|---|---|---|
| 6,591,011 B1 * | 7/2003 | Nielsen | G06K 9/6211 382/194 |
| 6,923,080 B1 | 8/2005 | Dobler et al. | |
| 7,697,839 B2 | 4/2010 | Cutler | |
| 8,009,930 B2 * | 8/2011 | Li | G06T 7/80 345/649 |
| 8,208,029 B2 | 6/2012 | Kim et al. | |
| 8,269,848 B2 | 9/2012 | Kakinami | |
| 8,401,240 B2 | 3/2013 | Dixon et al. | |
| 8,487,993 B2 | 7/2013 | Cunningham et al. | |
| 8,564,670 B2 | 10/2013 | Kim et al. | |
| 9,536,306 B2 * | 1/2017 | Natroshvili | G06T 7/0018 |
| 9,607,219 B2 * | 3/2017 | Greveson | G06K 9/00476 |
| 2006/0192660 A1 * | 8/2006 | Watanabe | B60R 1/00 340/435 |
| 2008/0002023 A1 * | 1/2008 | Cutler | G06T 3/4038 348/36 |
| 2008/0181488 A1 * | 7/2008 | Ishii | B60R 1/00 382/154 |
| 2008/0231710 A1 | 9/2008 | Asari et al. | |
| 2009/0175492 A1 | 7/2009 | Chen | |
| 2014/0098229 A1 | 4/2014 | Lu et al. | |

OTHER PUBLICATIONS

Salvi J et al: "A comparative review of camera calibrating methods with accuracy evaluation", Pattern Recognition, Elsevier, GB, vol. 35, No. 7, Jul. 1, 2002, pp. 1617-1635, XP004345158, ISSN: 0031-3203, DOI: 10.1016/S0031-3203 (01) 00126-1 the whole document.

Heung-Yeung Shum et al.: "Systems and Experiment Paper: Construction of Panoramic Image Mosaics with Global and Local Alignment", International Journal of Computer Vision, Kluwer Academic Publishers, Bo, vol. 36, No. 2, Feb. 1, 2000, pp. 101-130, XP019216353, ISSN: 1573-1405.

International Preliminary Report on Patentability from corresponding International Application No. PCT/US2016/026693, dated Oct. 10, 2017.

* cited by examiner

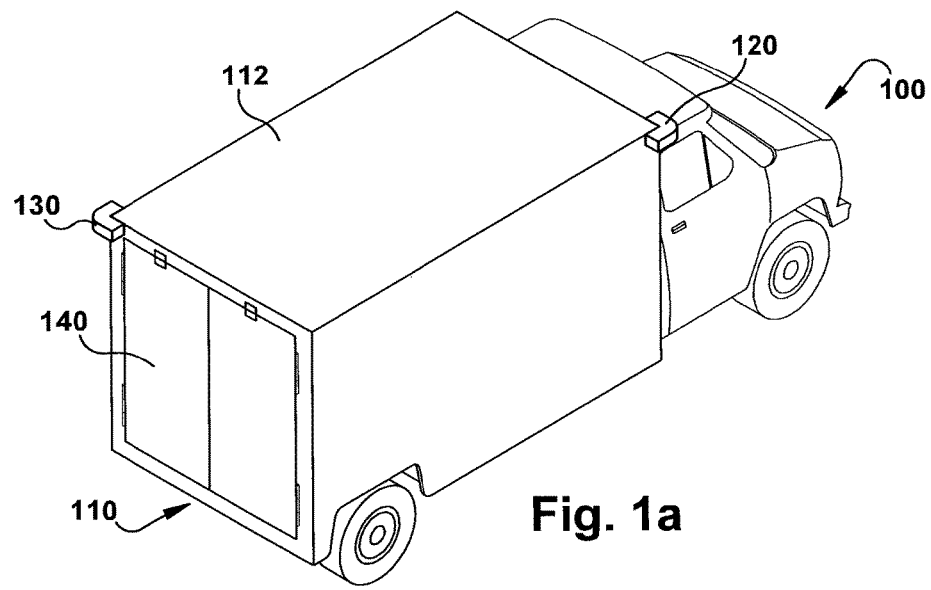
Fig. 1a
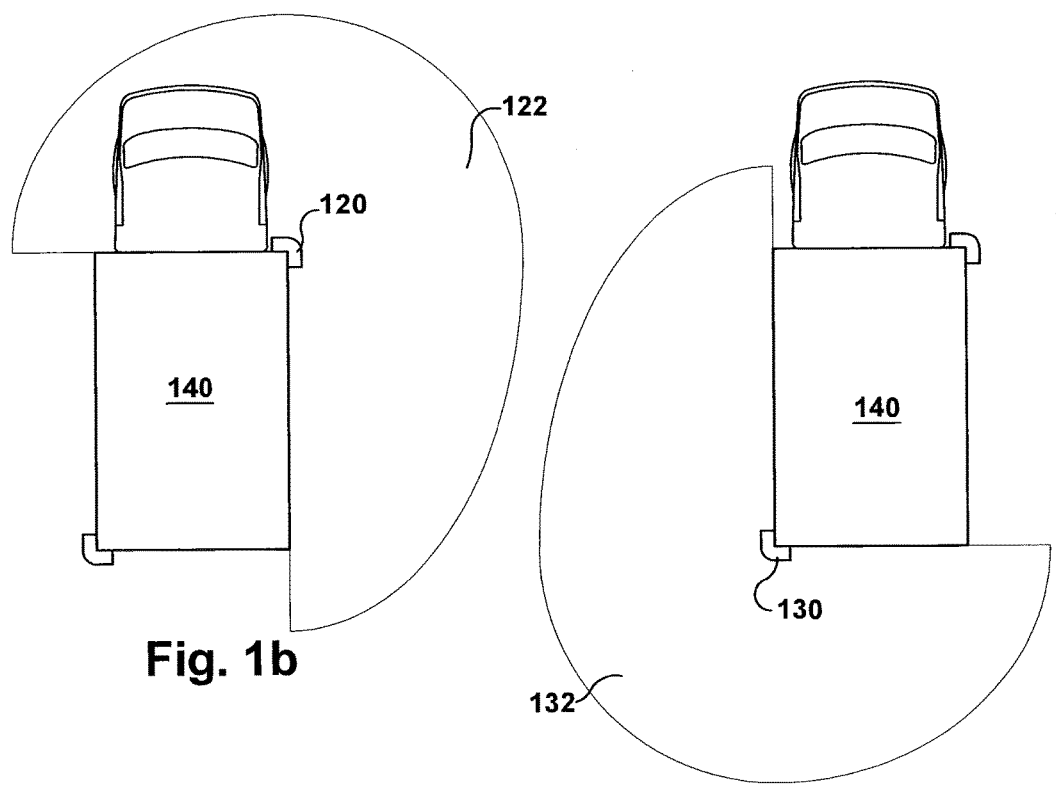
Fig. 1b
Fig. 1c

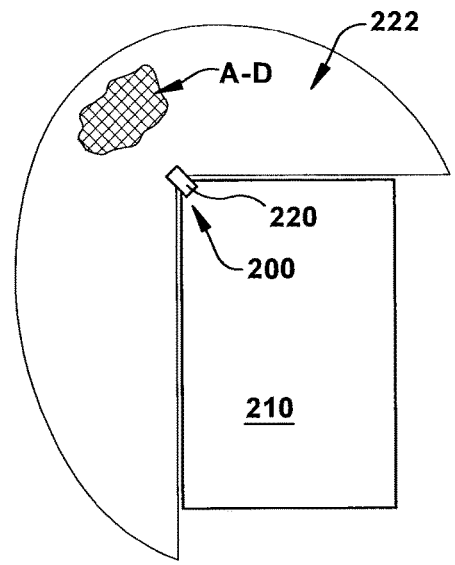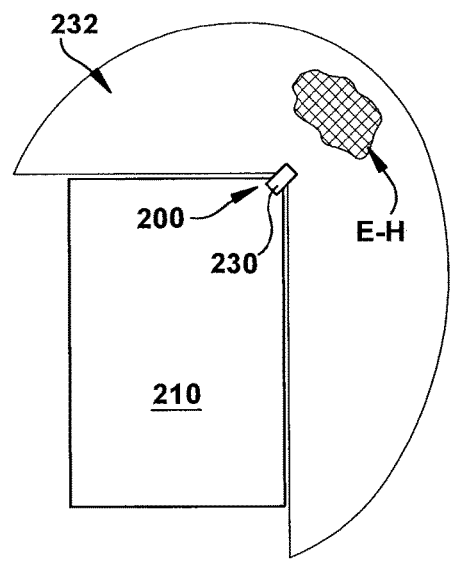
Fig. 2b    Fig. 2c
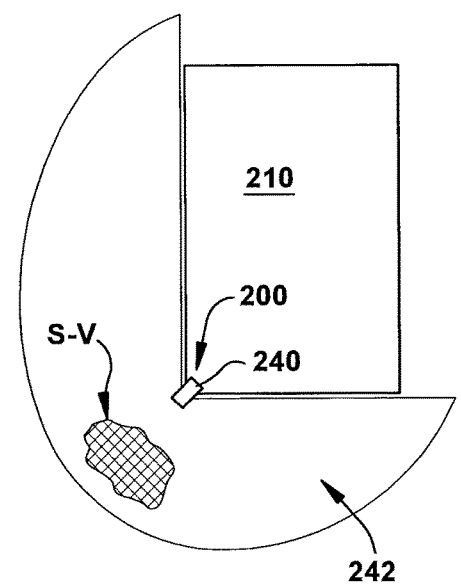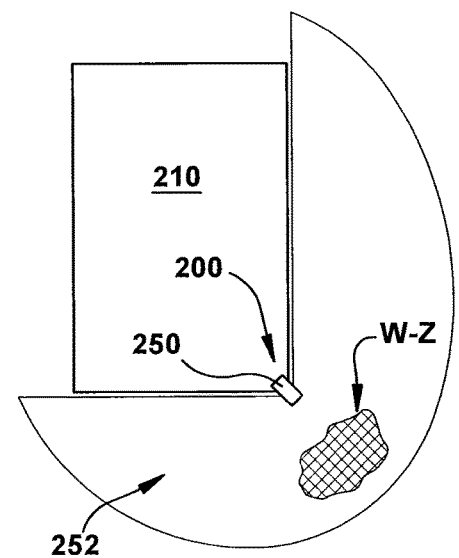
Fig. 2d    Fig. 2e

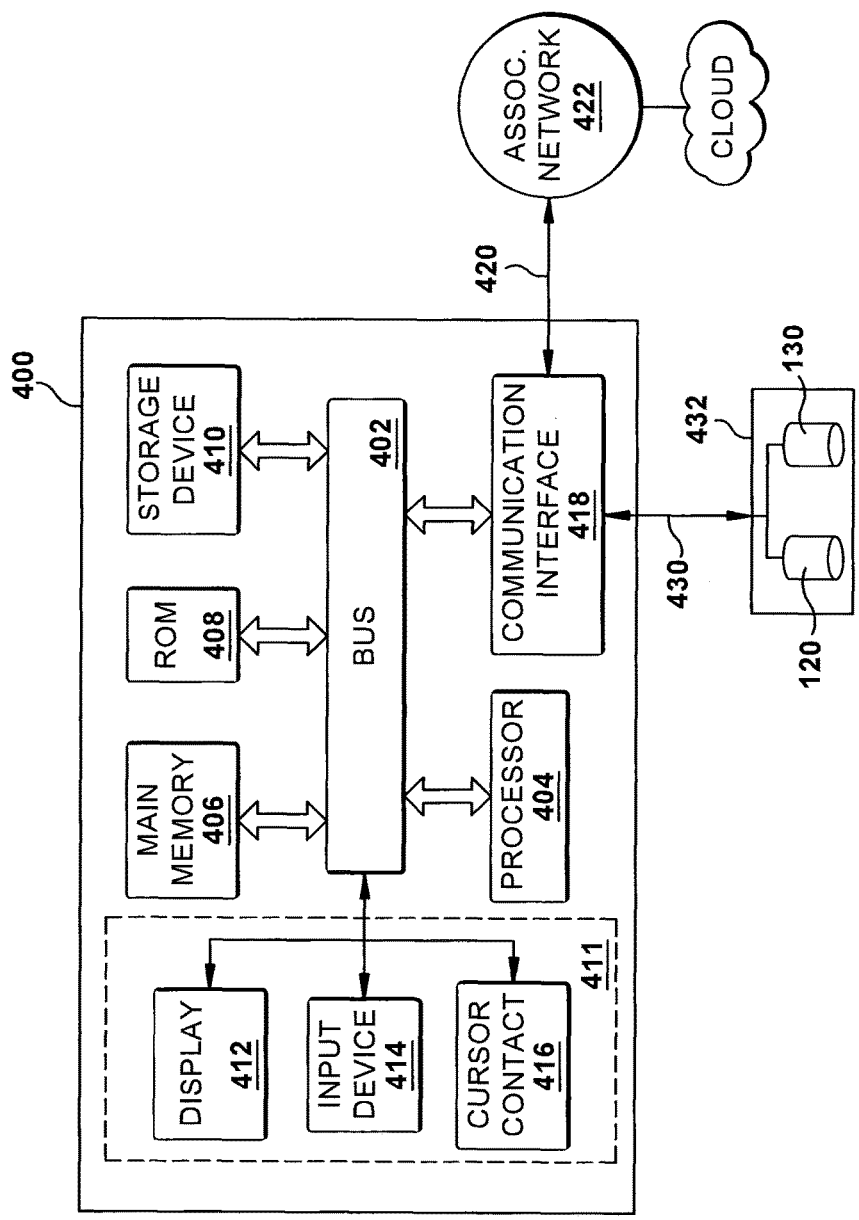

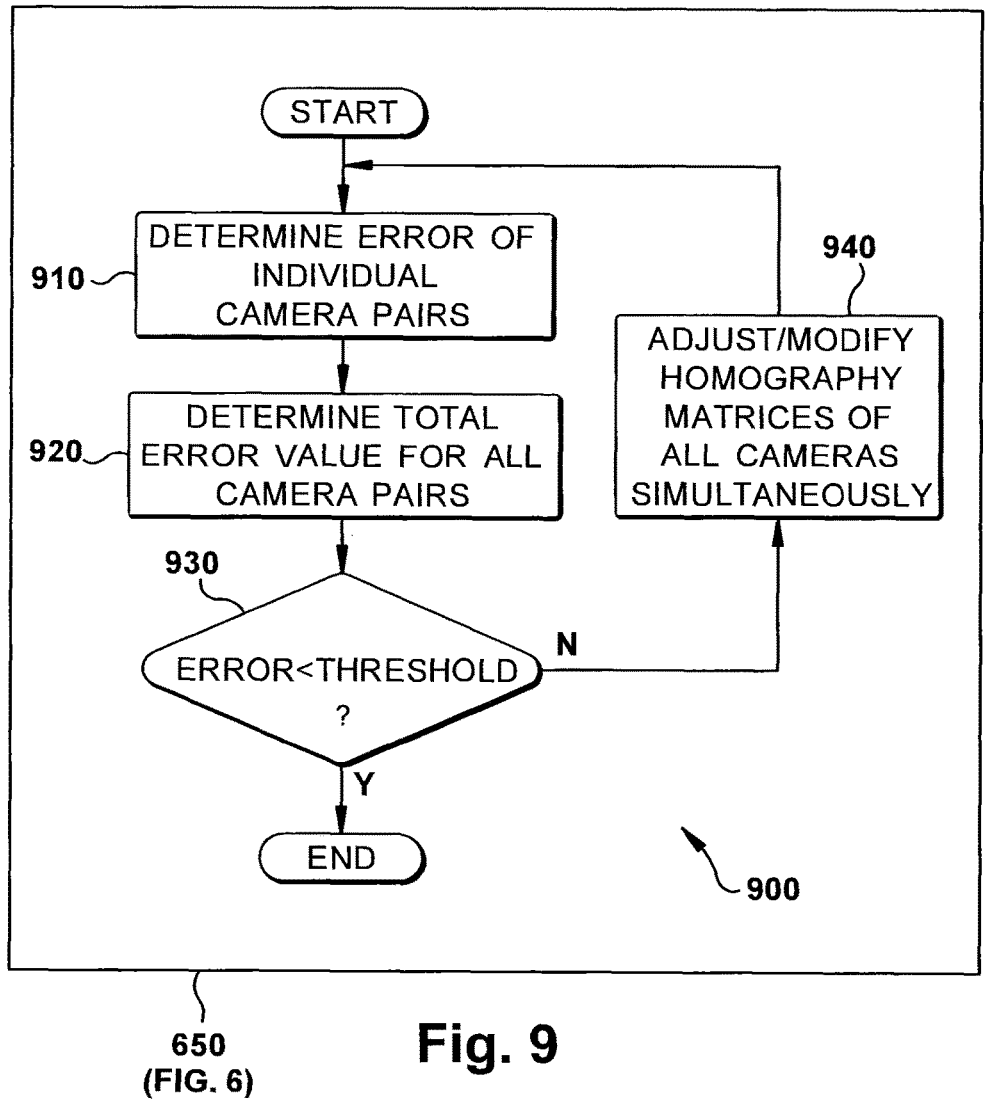

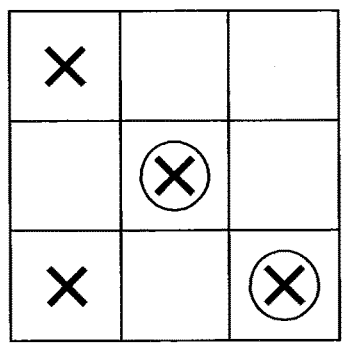 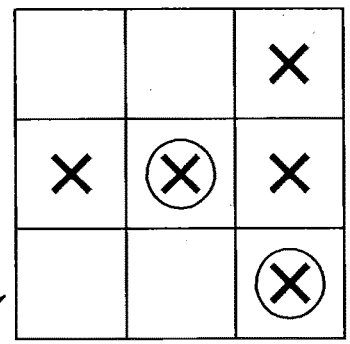
Fig. 10a 1025   1035 Fig. 10b
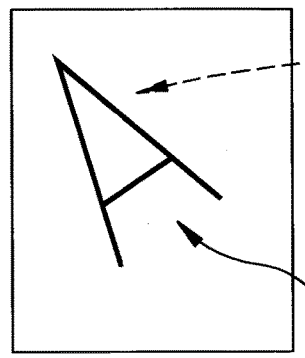 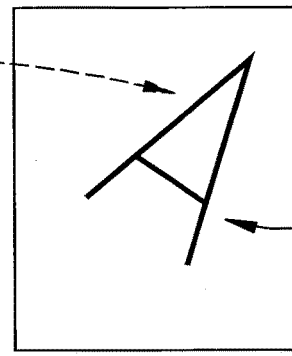
1027   1037
Fig. 10c

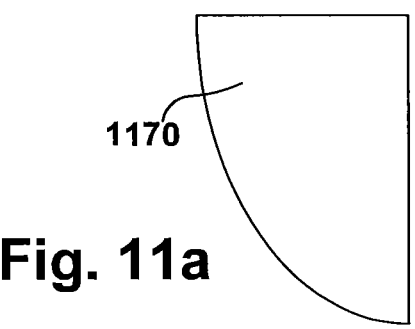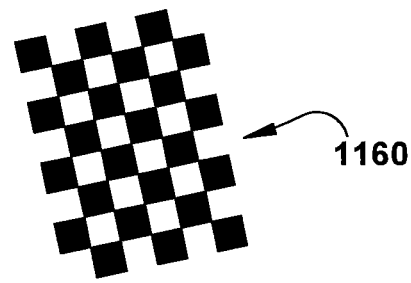
Fig. 11a
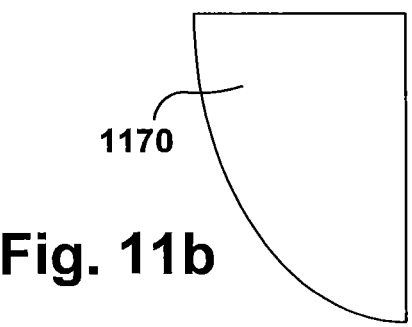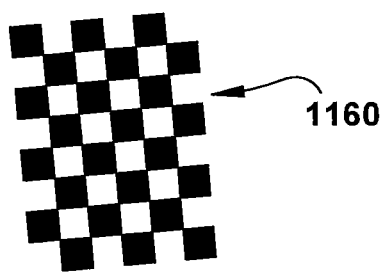
Fig. 11b
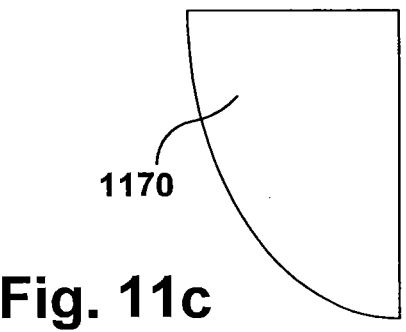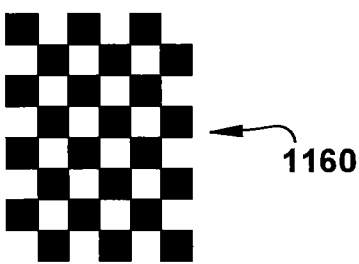
Fig. 11c

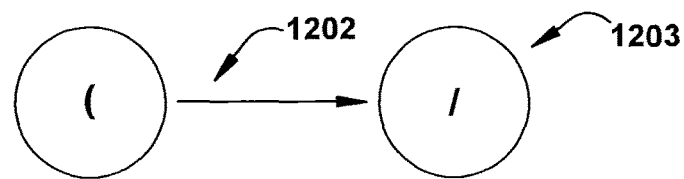
Fig. 12a
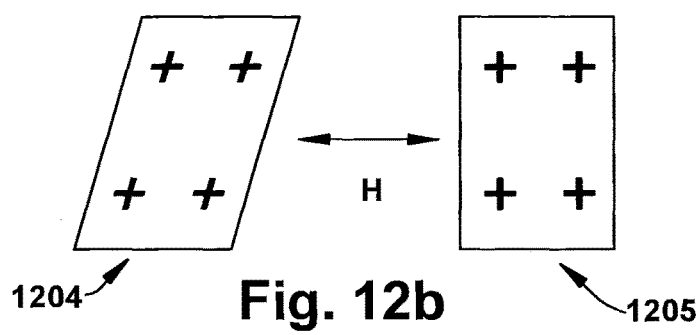
Fig. 12b
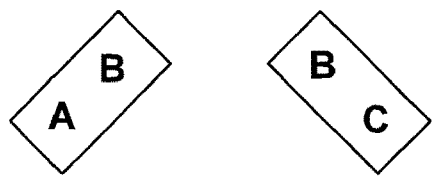
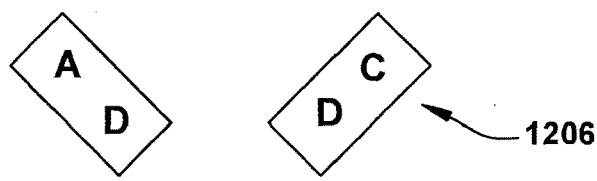
Fig. 12c
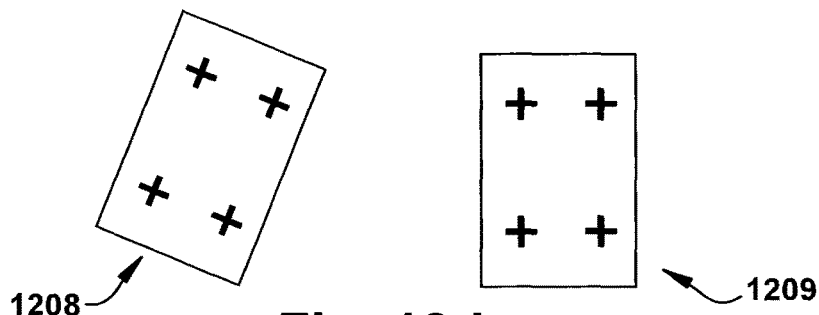
Fig. 12d

VEHICLE 360° SURROUND VIEW SYSTEM HAVING CORNER PLACED CAMERAS, AND SYSTEM AND METHOD FOR CALIBRATION THEREOF

TECHNICAL FIELD

The embodiments herein relate generally to vision/imaging systems and more specifically to vehicle 360° surround view camera systems providing a bird's eye view of a continuous region surrounding a vehicle such as a cargo truck, and to systems and methods for calibrating such 360° surround view camera systems. The example embodiments herein will be described in connection with a 360° surround view camera system using a single system of four (4) corner-placed cameras for a non-articulated cargo truck, and to static calibration systems and methods. However, it is to be appreciated that the embodiments are not limited to these applications, but also find use in many other applications including for example dynamic calibration of 360° surround view camera systems, and to vision/imaging systems for articulated cargo truck applications using four (4) corner-placed cameras on a tractor and four (4) corner-placed cameras on a trailer selectively connectable with the tractor.

The example embodiments herein will be described in connection with vehicles using a single system of two (2), four (4), and eight (8) corner-placed cameras, and to static calibration systems and methods, but it is to be appreciated that the embodiments are not limited to these applications, but also find use in many other applications including for example surround view camera system dynamic calibration systems and methods, and to vision/imaging systems for multiple articulated cargo trucks and other apparatus using plural corner-placed cameras, and to dynamic calibration systems therefor and methods thereof.

BACKGROUND

It is common to place cameras on vehicles for purposes of providing one or more images of areas surrounding the vehicle to an operator. This helps to improve the awareness of the operator relative to conditions near the vehicle for avoiding collisions and to assist in maneuvering the vehicle for parking or movement near loading docks or the like. For these reasons and for purposes of attempting to provide a "surround view" of the area around the vehicle, cameras have been located at various positions on the vehicle such as for example at the front end, rear, left side, and right side. These cameras offer the operator various views relative to the vehicle including forward, rear, left and right views. In some applications, the set of views are combined by abutting or "stitching" into a single image for display on the dashboard of the vehicle or the like to provide live panoramic or bird's eye views of the vehicle in its current setting for the convenience of the operator.

Combination of the several views provided by the separate cameras is complicated. Calibration of the cameras and of the overall surround view system provides the best results, but this step further complicates the installation. Some surround view camera systems are simply installed and used without calibration, but vehicle operators find these resultant composite images to be difficult to interpret. Other surround view camera systems use manual calibration techniques and still others use calibration targets placed in specific zones where adjacent camera images overlap. However, these techniques are time consuming and prone to error. Discrepancies between the respective individual images often manifest and this condition adversely affects the resultant overall composite or "stitched" image, particularly in the stitching zone. Also, the target placement and other requirements used in these calibration techniques restrict the flexibility of the calibration setup and also restrict the situations where automatic run-time calibration can be used.

It is therefore desirable to provide a vehicle 360° surround view system without these limitations and which provides realistic life-like images to a vehicle operator without introducing any mis-registration artifacts or other confusion into the image and, in particular, to provide a vehicle 360° surround view system having corner placed cameras, and systems and methods for easily and efficiently calibrating the surround view system.

BRIEF SUMMARY OF EXAMPLE EMBODIMENTS

In accordance with the embodiments herein, a vehicle 360° surround view system includes a set of two (2) or more cameras located at predetermined positions on the vehicle wherein the field of view of each camera overlaps the field of view of at least one other camera of the set of two (2) or more cameras, thereby providing a continuous area of overlapping fields of view completely surrounding the vehicle carrying the cameras. Further in accordance with the embodiments herein, systems and methods for calibrating the vehicle 360° surround view system described above are provided.

In another embodiment, the vehicle 360° surround view system includes a set of (4) cameras located at the four (4) corners of a traditional nominally rectangular-shaped vehicle. This makes calibration in accordance with further embodiments herein simpler and more accurate as every location around the vehicle is covered/imaged by at least two (2) cameras at all times versus just some areas in the corners as is the case with a 'traditional' camera mounting geometry including cameras centered at the front, back, and sides. In the embodiments herein, full 360° stereoscopic vision detection is provided all around the vehicle due to the two camera coverage of every location.

In a further embodiment, the vehicle 360° surround view system includes a set of (4) cameras located at the four (4) corners of a nominally rectangular-shaped tractor portion of a tractor trailer vehicle, and a set of (4) cameras located at the four (4) corners of a nominally rectangular-shaped trailer portion of the tractor trailer vehicle. Calibration is made simpler and more accurate as every location around the vehicle is covered/imaged by at least two (2) cameras at all times. Also, in the embodiment herein, full 360° stereoscopic vision detection is provided all around the vehicle due to the at least two (2) camera coverage of every location.

In a still further embodiment, a surround view system generates a bird's eye view of an area adjacent an associated apparatus disposed in an environment. The surround view system comprises a computer system comprising a processor, a non-transient memory operably coupled with the processor, and a plurality of cameras operatively coupled with the processor and memory. The plurality of cameras are disposed at selected positions on the associated apparatus. Each of the plurality of cameras respectively has a field of view projected onto the area adjacent the associated apparatus wherein each field of view overlaps at least one other field of view defining a continuous field of view overlap area completely surrounding the associated apparatus.

In a still further embodiment, a method is provided for calibrating a plurality of cameras disposed in an environment wherein each of the plurality of cameras respectively has a field of view projected onto an area adjacent the camera wherein each field of view overlaps at least one other field of view defining a continuous field of view overlap area completely surrounding a selected target area. The method determines a set of image registration errors in respective images of each pair of a plurality of cameras having overlapping fields of view. The method further determines an adjustment value based on the set of registration errors. The method further modifies homography matrix values of each camera of the set of cameras in accordance with the adjustment value.

In accordance with an embodiment, a method is provided for calibrating an associated imaging system providing a bird's eye view of an area surrounding an associated vehicle. The method includes receiving first image data related by a first transformation parameter to a first image of a first target area adjacent the associated vehicle, and receiving second image data related by a second transformation parameter to a second image of a second target area adjacent the associated vehicle, wherein a portion of the second target area overlaps a portion of the first target area at an overlap area. First collective image data is received, the first collective image data being related by the first and second transformation parameters to a composite image of a first plurality of target objects disposed in the overlap area. The method further determines a composite registration error between the collective image data and the area surrounding the associated vehicle in accordance with a comparison between locations of images the first plurality of target objects in the collective image data and known physical locations of the first plurality of target objects in the overlap area. In addition, the method includes modifying the first and second transformation parameters as globally modified first and second transformation parameters in accordance with the determined composite registration error to register the collective image data with the known physical locations of the plurality of target objects.

In addition, an apparatus is provided for calibrating an associated imaging system operatively coupled with an associated vehicle and providing a bird's eye view of an area surrounding the associated vehicle. The apparatus includes a communication interface operatively coupled with cameras of the associated imaging system and configured to communicate with the cameras, and a processor coupled with the communication interface. In this example embodiment, the processor is configured to receive first image data related by a first transformation parameter to a first image of a first target area adjacent the associated vehicle, and to receive second image data related by a second transformation parameter to a second image of a second target area adjacent the associated vehicle, wherein a portion of the second target area overlaps a portion of the first target area at an overlap area. The processor is further configured to receive first collective image data related by the first and second transformation parameters to a composite image of a first plurality of target objects disposed in the overlap area, and to determine a composite registration error between the collective image data and the area surrounding the associated vehicle in accordance with a comparison between locations of images the first plurality of target objects in the collective image data and known physical locations of the first plurality of target objects in the overlap area. The processor is still further configured to modify the first and second transformation parameters as globally modified first and second transformation parameters in accordance with the determined composite registration error to register the collective image data with the known physical locations of the plurality of target objects.

The vision/imaging systems and methods and apparatus for calibrating the vision/imaging systems of the example embodiments are advantageous over traditional devices in many ways including that the embodiments herein minimize the errors in the registration of multiple images stitched together to provide a composite image, while also providing a wide range of imaging and calibration options and enhancements.

Additional advantages and features of the embodiments herein will become apparent from the following description and appended claims, taken in conjunction with the accompanying drawings.

BRIEF DESCRIPTION OF THE DRAWINGS

The foregoing and other features of the embodiments herein will become apparent to those skilled in the art to which the present surround view system, calibration systems, and calibration methods relate upon reading the following description with reference to the accompanying drawings, in which:

FIG. 1a is a perspective view of a vehicle in which a 360° surround view camera system according to an embodiment is applied, showing an installation condition of a camera pair on the vehicle;

FIGS. 1b and 1c are a schematic top plan views showing a field of view of each camera installed in the vehicle of FIG. 1a;

FIG. 1e is a schematic top plan view showing a set of imaging areas resulting from the arrangement of cameras supported at the selected positions on the body of the vehicle as shown in FIG. 1a;

FIGS. 2b-2e are schematic top plan views showing a field of view of each camera installed in the vehicle of FIG. 2;

FIG. 2g is a schematic top plan view showing a set of imaging areas resulting from the arrangement of cameras supported at the selected positions on the body of the vehicle as shown in FIG. 2a;

FIGS. 3b-3i are schematic top plan views showing a field of view of each camera installed in the vehicle of FIG. 3a;

FIG. 3k is a schematic top plan view showing a set of imaging areas resulting from the arrangement of cameras supported at the selected positions on the body of the tractor trailer vehicle as shown in FIG. 3a;

FIG. 4 is a block diagram that illustrates a computer system suitable for executing the example embodiments herein, and upon which the example embodiments may be implemented;

FIG. 9 is a flow chart illustrating a portion of the method of FIG. 6 for optimizing the registration of images of the cameras of the 360° surround view systems of the example embodiments;

FIGS. 10a and 10b illustrate simple examples of registration of first and second 3×3 edge pixel images;

FIG. 10c illustrates a registration of a set of simple images showing a joining of the images away from the seam between the images;

FIGS. 11a-11c are schematic views of compensation movement of a composite image illustrating a progression of the rotation and shift/translation registration optimization set out in FIG. 11; and FIGS. 12a-12d are simplistic illustrations of image measurement and registration optimization in accordance with the example embodiments herein.

DETAILED DESCRIPTION OF EXAMPLE EMBODIMENTS

Figure 1D:
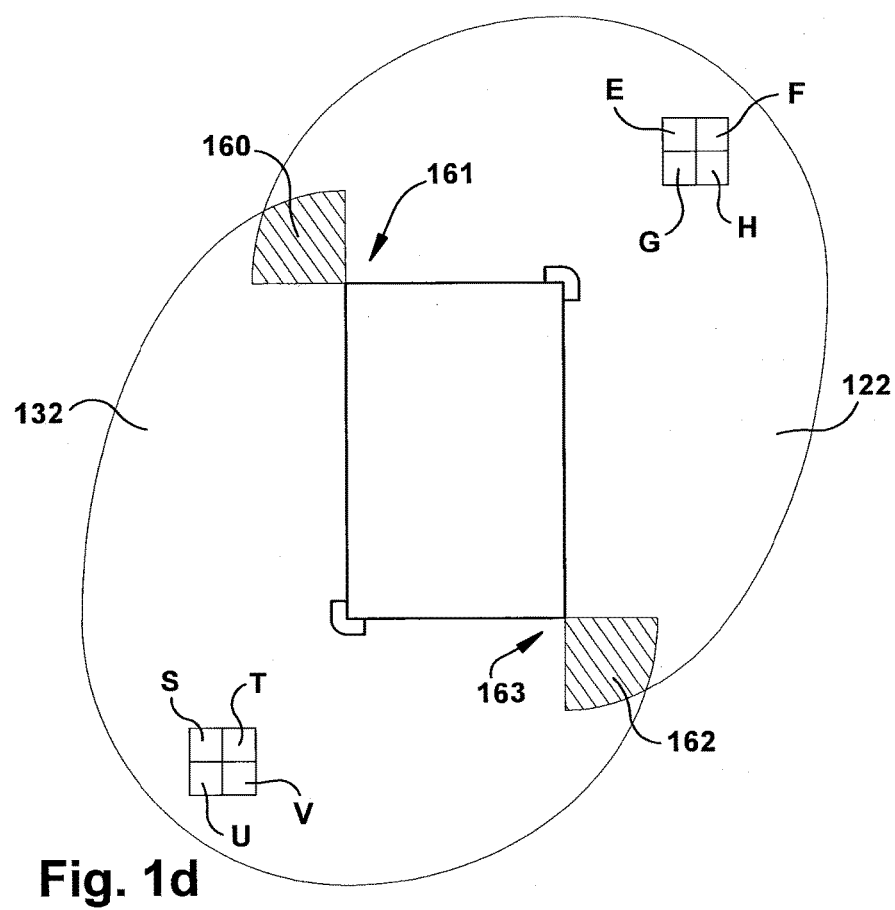
FIG. 1d is a schematic top plan view showing a composite of the fields of view of each camera installed in the vehicle of FIG. 1a put together.

With reference now to the drawing Figures, wherein the showings are for purposes of describing the embodiments only and not for purposes of limiting same, example embodiments herein relate to surround view camera systems 100, 200, 300 for vehicles having cameras placed at selected positions on the vehicles, and to systems and methods for calibrating the surround view camera systems. The embodiments herein are also applicable to the placement of the cameras at various positions on the vehicles such as, for example, at the corners of the vehicles, and at corners of various one or more substantially rectangular portions of the vehicles. It is to be appreciated that the embodiments herein are applicable to many different camera placement schemes and to many different cameras having various fields of view, resolution, and other characteristics as may be necessary or desired.

Figure 1E:
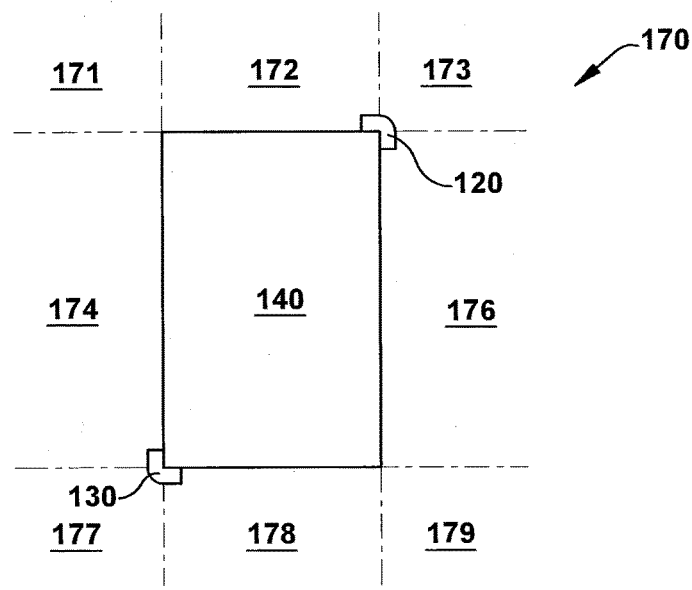

As representative of the embodiments and with reference in particular first to FIG. 1a, the perspective top view shown there illustrates a vehicle 110 in which a 360° surround view camera system 100 according to an embodiment is applied, showing an arrangement of cameras 120, 130 supported at selected positions on the body 140 of the vehicle 110. FIGS. 1b and 1c are schematic top plan views showing a field of view of each camera 120, 130 installed on the body 140 of the vehicle 110 of FIG. 1a, and FIG. 1d is a schematic top plan view showing a composite construction of the fields of view of the cameras installed in the vehicle of FIG. 1a put together and illustrating overlapping fields of view of the cameras. Lastly, FIG. 1e is a schematic top plan view showing a set 170 of imaging areas 171-174 and 176-179 resulting from the arrangement of cameras 120, 130 supported at the selected positions on the body 140 of the vehicle 110 as shown in FIGS. 1a-1d.

Although a basic delivery panel-type truck 112 is shown as the vehicle 110 in FIGS. 1a-1d, the vehicle 110 can be any other vehicle such as a regular passenger automobile or any other type of mobile apparatus having an overall generally rectangular shape. Also, of course the illustrated panel-type truck 112 vehicle 110 illustrated is configured to be located on and move relative to the ground such as a road surface or the like, other vehicles that would be benefited by the surround view camera systems 100, 200, 300 of the various embodiments herein include various robotic devices such as automatic guided vehicles (AGVs) configured to be located on and move relative to the floor of a factory or manufacturing facility or the like. In the following explanations, the ground is assumed to be a horizontal plane and the "height" of these cameras indicates a height with respect to the ground.

As shown in FIG. 1a, cameras (image pickup devices) 120 and 130 are mounted at the uppermost parts of the vehicle 110. The first camera 120 is placed for example at a right uppermost forward part of the vehicle 110, and the second camera 130 is placed for example at the left uppermost rearward part of the vehicle 110. The cameras 120 and 130 simply may be referred to herein and below in this and in the embodiments to be described as the cameras or each camera without necessarily being distinguished from each other. Although the cameras are arranged as shown, their positions may equivalently be exchanged in accordance with the embodiment into several relative positions such as, for example, by locating the first camera 120 at the left upper most forward part of the vehicle 110, and locating the second camera 130 at the right upper most rearward part of the vehicle 110.

It is to be appreciated that the cameras 120 and 130 are arranged on the vehicle 110 such that an optical axis of the first camera 120 is directed obliquely downward at an angle of about 15°-45° towards the forward direction of the vehicle 110, and an optical axis of the second camera 130 is directed obliquely downward at an angle of about 15°-45° towards the backward direction of the vehicle 110. It is to be further appreciated that the field of view of each camera, i.e. spatial region of which each camera can capture an image, is generally hemispherical in overall shape and is quite large. More particularly, in the embodiment illustrated, the cameras 120 and 130 each have a field of view of about 360° and are commonly referred to in the industry as "fish eye" lens cameras or imagers. The cameras 120 and 130 may be of the type Blue Eagle DC3K-1-LVD available from Silicon Micro Systems, or any similar cameras available from other sources and having the desired characteristics of the embodiments.

FIG. 1b shows the usable field of view 122 of the first camera 120 viewed from above, in other words, the portion of the generally hemispherical field of view of the forward/side directed first camera 120 as projected onto the generally planar ground surface at the front of the vehicle 110. The remaining portion of the generally hemispherical field of view of the forward/side directed first camera 120 is, in general, obstructed by the gross front shape of the vehicle 110 in that region. Similarly, FIG. 1c shows the usable field of view 132 of the second camera 130 viewed from above, in other words, the portion of the generally hemispherical field of view of the rearward directed second camera as projected onto the ground surface at the back of the vehicle 110. The remaining portion of the generally hemispherical field of view of the rearward/side directed second camera 130 is, in general, obstructed by the gross rear shape of the vehicle 110 in that region. FIG. 1d shows a schematic view in which all of the fields of view as shown in FIGS. 1b and 1c are put together. The shaded area in FIG. 1d will be described below.

It is to be appreciated that, in the illustrated embodiment, the forward directed first camera 120 primarily captures an image of a subject or object, including the road surface, located within a predetermined region in the front and to the right side of the vehicle 110. Similarly in the illustrated embodiment, the rearward directed second camera 130 primarily captures an image of a subject or object, including the road surface, positioned within a predetermined region behind and to the left side of the vehicle 110. The fields of view 122 and 132 of the cameras 120 and 130, however, overlap at regions 160, 162 substantially adjacent the left front and right rear corners of the vehicle 110, respectively. These regions will be referred to in this embodiment and in other embodiments herein as the common or overlapping fields of view. FIG. 1d shows these common fields of view regions 160, 162 as shaded areas. In this embodiment, overall, the fields of view 122 and 132 overlap at a common or overlapping first field 160 at a forward left region 161 relative to the vehicle 110 and, similarly, the fields of view 122 and 132 overlap at a common or overlapping second field 162 at a rearward right region 163 relative to the vehicle 110.

FIG. 1e is a schematic top plan view showing a set 170 of imaging areas 171-174 and 176-179 resulting from the arrangement of cameras 120, 130 supported at the selected positions on the body of the vehicle 110 as shown in FIGS. 1a-1d. With reference now to that Figure, the first camera 120 is configured by its orientation, and optical and other characteristics to directly image the imaging areas 171, 172, 173, 176, and 179 of the set 170 of imaging areas. Similarly, the second camera 130 is configured by its orientation, and optical and other characteristics to directly image the imaging areas 171, 174, 177, 178, and 179 of the set 170 of imaging areas. In addition and as described above, the fields of view 122, 132 of the first and second cameras 120, 130 overlap at the forward left region 161 (FIG. 1d) relative to the vehicle 110, and the fields of view 122, 132 also overlap at the rearward right region 163 (FIG. 1d) relative to the vehicle 110. Accordingly, the imaging areas 171 and 179 are areas of the set of imaging areas imaged by both cameras 120, 130. That is, the images obtained by the cameras 120, 130 overlap in these regions. Embodiments herein provide improved registration between the images obtained by the cameras 120, 130 in these regions 171, 179 for best realistic visualization of the bird's eye view of the region surrounding the vehicle 110. To the end, methods and apparatus for modifying the images obtained by the cameras 120, 130 to render a best fit composite image in these regions 171, 179 as well as in the singularly imaged regions 172, 173, 176 and 174, 177, 178 will be described below.

Figure 2A:
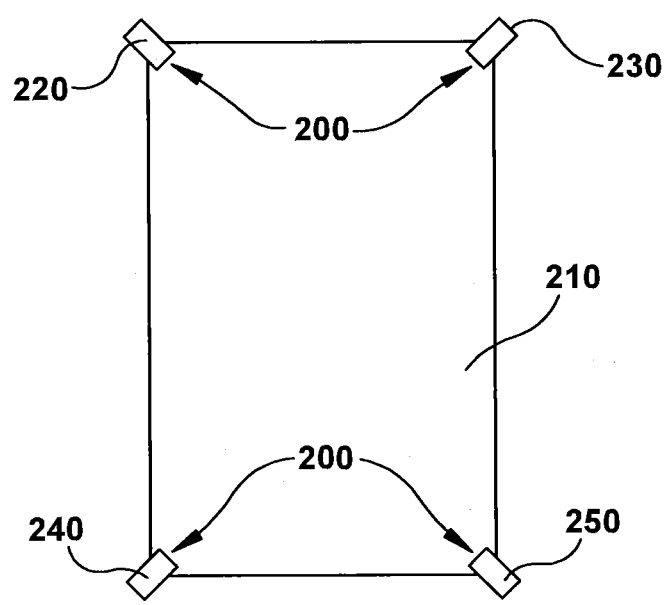
FIG. 2a is a top plan view of a vehicle in which a 360° surround view system according to a further embodiment is applied, showing an installation condition of each camera being located at corners of a nominally rectangular delivery truck vehicle.
Figure 2F:
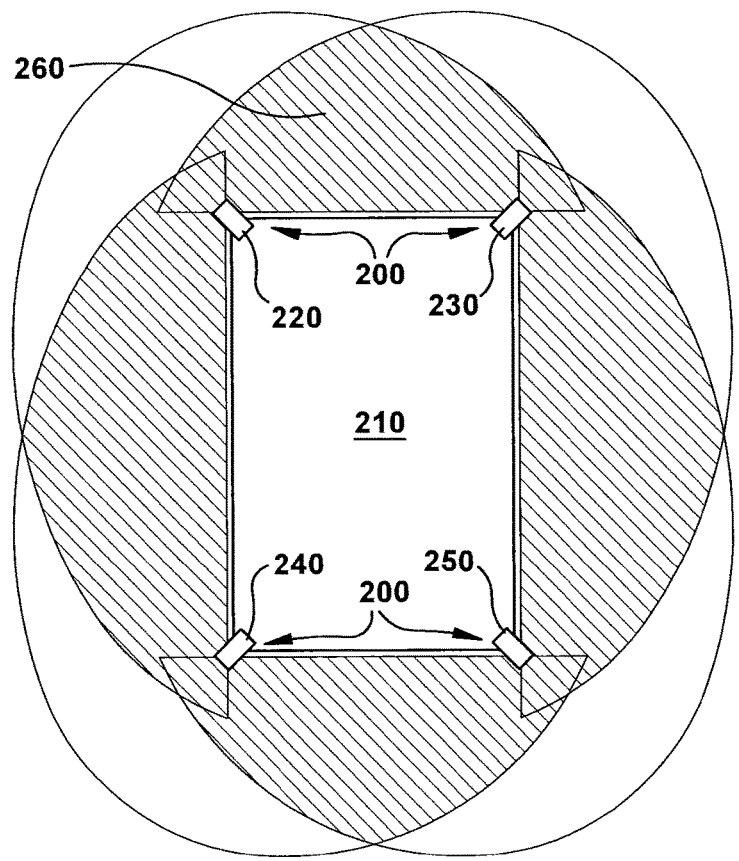
FIG. 2f is a schematic top plan view showing a composite of the fields of view of each camera installed in the nominally rectangular delivery truck vehicle of FIG. 2a put together.
Figure 2G:
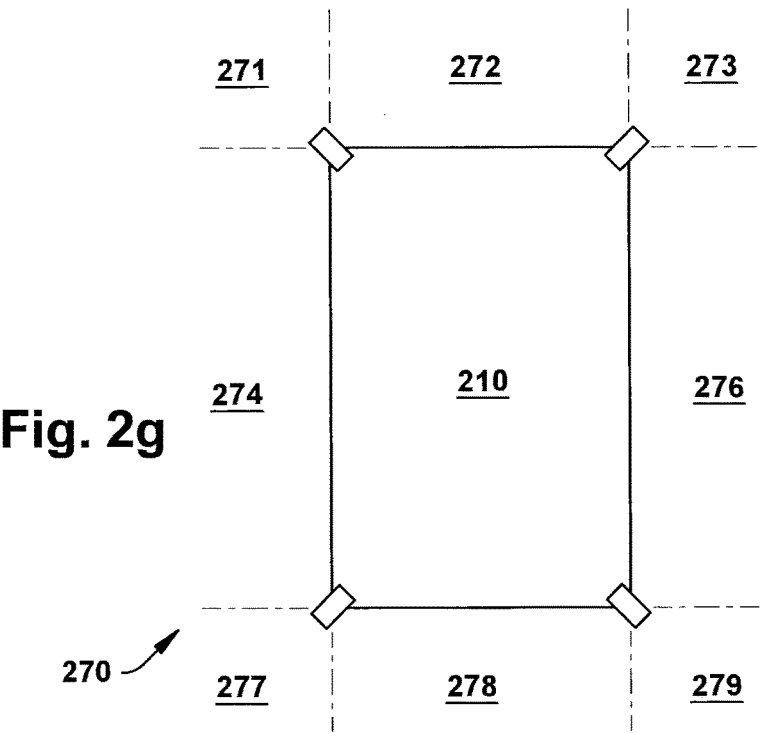

Further representative of the embodiments herein and with reference in particular next to FIG. 2a, the schematic top plan view shown there illustrates a vehicle 210 in which a 360° surround view camera system 200 according to a second example embodiment is applied, showing an arrangement of cameras 220, 230, 240, and 250 mounted on or otherwise attached with the vehicle 210. FIGS. 2b-2e are schematic top plan views showing a field of view of each camera 220, 230, 240, and 250 installed on the vehicle 210 of FIG. 2a, and FIG. 2f is a schematic top plan view showing a composite of the fields of view of each camera installed in the vehicle of FIG. 2a put together. Lastly, FIG. 2g is a schematic top plan view showing a set 270 of imaging areas 271-274 and 276-279 resulting from the arrangement of cameras 220, 230, 240, 250 supported at the selected positions on the body 214 of the vehicle 210 as shown in FIGS. 2a-2f.

Although the panel-type delivery van 212 having a nominally rectangular overall shape is again shown as the vehicle 210 in FIGS. 2a-2g, the vehicle 210 can be any other vehicle such as a regular passenger automobile or any other type of mobile apparatus such as for example an AGV having an overall generally rectangular shape and including a set of camera mounts or other similar devices suitable for supporting the cameras 220, 230, 240, and 250 in an elevated position relative to the vehicle 210. Also, the vehicle 210 is configured to be located on and move relative to the ground such as a road surface or a parking lot adjacent other vehicles, loading docks, or the like. In the following explanations, the ground is assumed to be a horizontal plane and the "height" of these cameras indicates a height with respect to the ground.

As shown in FIG. 2a, cameras (image pickup devices) 210, 220, 230, and 250 are mounted at uppermost parts of the vehicle such as, for example, at the corners of the vehicle 210. The first camera 220 is placed for example at the left uppermost forward part of the vehicle 210 and is directed outwardly from the vehicle 210 at an angle of about 15°-45°, the second camera 230 is placed for example at the right uppermost forward part of the vehicle 210 and is similarly directed outwardly from the vehicle 210 at an angle of about 15°-45°, the third camera 240 is placed for example at the left uppermost rearward part of the vehicle 210 and is similarly directed outwardly from the vehicle 210 at an angle of about 15°-45° and, lastly, the fourth camera 250 is placed for example at the right uppermost rearward part of the vehicle 210 and is similarly directed outwardly from the vehicle 210 at an angle of about 15°-45°. The cameras 220, 230, 240, and 250 simply may be referred to herein and below in this and in the embodiments to be described as the cameras or each camera without necessarily being distinguished from each other.

It is to be appreciated that the cameras 220, 230, 240, and 250 are arranged on the vehicle 210 such that an optical axis of the first camera 220 is directed obliquely downward towards the left of the vehicle 210 and forward as necessary or desired, an optical axis of the second camera 230 is directed obliquely downward towards the right of the vehicle 210 and forward as necessary or desired, an optical axis of the third camera 240 is directed obliquely downward towards the left of the vehicle 210 and rearward as necessary or desired, and an optical axis of the fourth camera 250 is directed obliquely downward towards the right of the vehicle 210 and rearward as necessary or desired. It is to be further appreciated that the field of view of each camera, i.e. spatial region of which each camera can capture an image, is generally hemispherical in overall shape and is quite large. More particularly, in the embodiment illustrated, the cameras 220, 230, 240, and 250 each have a field of view of about 360° and are commonly referred to in the industry as "fish eye" lens cameras or imagers. Similar to the embodiment of FIGS. 1a-1e, the cameras 220, 230, 240, and 250 of the embodiment of FIGS. 2a-2h may be of the type Blue Eagle DC3K-1-LVD available from Silicon Micro Systems, or any similar cameras available from other sources and having the desired characteristics of the embodiment. It is to be appreciated that the arrangement and pointing directions of the cameras 220, 230, 240, and 250 is particular to each vehicle and to the characteristics of each camera. For example the external side view mirrors carried by many commercial vehicles provide, on the one hand, a convenient mounting point for cameras and, on the other hand, might interfere with other cameras mounted to other portions of the vehicle. In this example, the mirrors of the associated vehicle can determine where to mount a camera, either since they block or otherwise obstruct the view or since the mirrors provide a good mounting location.

FIG. 2b shows the usable field of view 222 of the first camera 220 viewed from above, in other words, the generally hemispherical field of view of the left and forward directed first camera as projected onto the generally planar ground surface at the left front of the vehicle 210. Similarly, FIG. 2c shows the usable field of view 232 of the second camera 230 viewed from above, in other words, the generally hemispherical usable field of view of the right and forward directed second camera as projected onto the ground surface at the right front of the vehicle 210. FIG. 2d shows the usable field of view 242 of the third camera 230 viewed from above, in other words, the generally hemispherical field of view of the left and rearward directed third camera as projected onto the generally planar ground surface at the left rear of the vehicle 210. Lastly, FIG. 2e shows the usable field of view 252 of the fourth camera 250 viewed from above, in other words, the generally hemispherical field of view of the right and rearward directed fourth camera as projected onto the ground surface at the right rear of the vehicle 210. It is of course to be appreciated that the remaining portions of the generally hemispherical fields of view of the left and forward directed first camera 220, the right and forward directed second camera 230, the left and rearward directed third camera 240, and the right and rearward directed fourth camera 250 are, in general, obstructed by the gross rear shape of the vehicle 210 in that region. FIG. 2f shows a schematic view in which all of the fields of view as shown in FIGS. 2b-2e are put together, and will be described below.

It is to be appreciated that, in the illustrated embodiment, the left and forward directed first camera 220 primarily captures an image of a subject or object, including the road surface, located within a predetermined region in front and to the left of the vehicle 210. Further, the right and forward directed second camera 230 primarily captures an image of a subject or object, including the road surface, located within a predetermined region in front and to the right of the vehicle 210. Still further, the left and rearward directed third camera 240 primarily captures an image of a subject or object, including the road surface, located within a predetermined region in the rear and to the left of the vehicle 210. Yet still further, the right and rearward directed fourth camera 250 primarily captures an image of a subject or object, including the road surface, located within a predetermined region in the rear and to the right of the vehicle 210.

The fields of view 222, 232, 242, and 252 of the cameras 220, 230, 240, and 250 however, overlap forming a continuous region 260 of overlapping fields of view substantially surrounding the vehicle 210. This region 260 will be referred to in this embodiment and in other embodiments herein as a common or continuous overlapping field of view. In FIG. 2f, the common fields of view are shown as the shaded area. In this embodiment, overall, the fields of view 222, 232, 242, and 252 overlap at a common or overlapping continuous field 260 essentially forming a complete uninterrupted ring around the vehicle from corner to corner including views directed towards the obliquely left-forward of the vehicle 210; towards the obliquely right-forward of the vehicle 210; towards the obliquely left-backward of the vehicle 210; and towards the obliquely right-backward of the vehicle 210.

FIG. 2g is a schematic top plan view showing a set 270 of imaging areas 271-274 and 276-279 resulting from the arrangement of cameras 220, 230, 240, 250 supported at the selected positions on the body 214 of the vehicle 210 as shown in FIGS. 2a-2f. With reference now to that Figure, the first camera 220 is configured by its orientation, and optical and other characteristics to directly image the imaging areas 271, 272, 273, 274, and 277 of the set 270 of imaging areas. Similarly, the second camera 230 is configured by its orientation, and optical and other characteristics to directly image the imaging areas 271, 272, 273, 276, and 279 of the set 270 of imaging areas. The third camera 240 is configured by its orientation, and optical and other characteristics to directly image the imaging areas 271, 274, 277, 278, and 279 of the set 270 of imaging areas. Lastly, the fourth camera 250 is configured by its orientation, and optical and other characteristics to directly image the imaging areas 273, 276, 277, 278, and 279 of the set 270 of imaging areas.

In addition and as described above, the fields of view 222 and 232 of the first and second cameras 220, 230 overlap at a forward region relative to the vehicle 210, the fields of view 232 and 252 of the second and fourth cameras 230, 250 overlap at a rightward region relative to the vehicle 210, the fields of view 222 and 242 of the first and third cameras 220, 240 overlap at a leftward region relative to the vehicle 210, and the fields of view 242, 252 of the third and fourth cameras 240, 250 overlap at a rearward region relative to the vehicle 210. Accordingly, all of the imaging areas 271-274 and 276-279 are areas of the set 270 of imaging areas that are imaged by at least two (2) of the cameras 220, 230, 240, 250, thereby providing the continuous region 260 of overlapping fields of view substantially surrounding the vehicle 210. That is, the images obtained by the cameras 220, 230, 240, 250 overlap in all of these regions.

It is to be appreciated, however, that the imaging regions 273 and 277 are most distant from the cameras 220 and 250, and the imaging regions 271 and 279 are most distant from the cameras 230 and 240. Therefore, overlapping image areas most closely disposed relative to the camera set includes the imaging areas 272, 274, 276, 278 at the front, left, right, and rear of the vehicle 210. Embodiments herein provide improved registration between the images obtained by the cameras 220, 230, 240, 250 in these imaging areas 272, 274, 276, 278 for best realistic visualization of the bird's eye view of the region surrounding the vehicle 210. To that end, methods and apparatus will be described below for modifying the images obtained by the cameras 220, 230, 240, 250 to render a best fit composite image in these regions 272, 274, 276, 278 as well as in the imaged regions 271, 273, 277, 279 best imaged singularly by individual cameras, respectively.

Figure 3A:
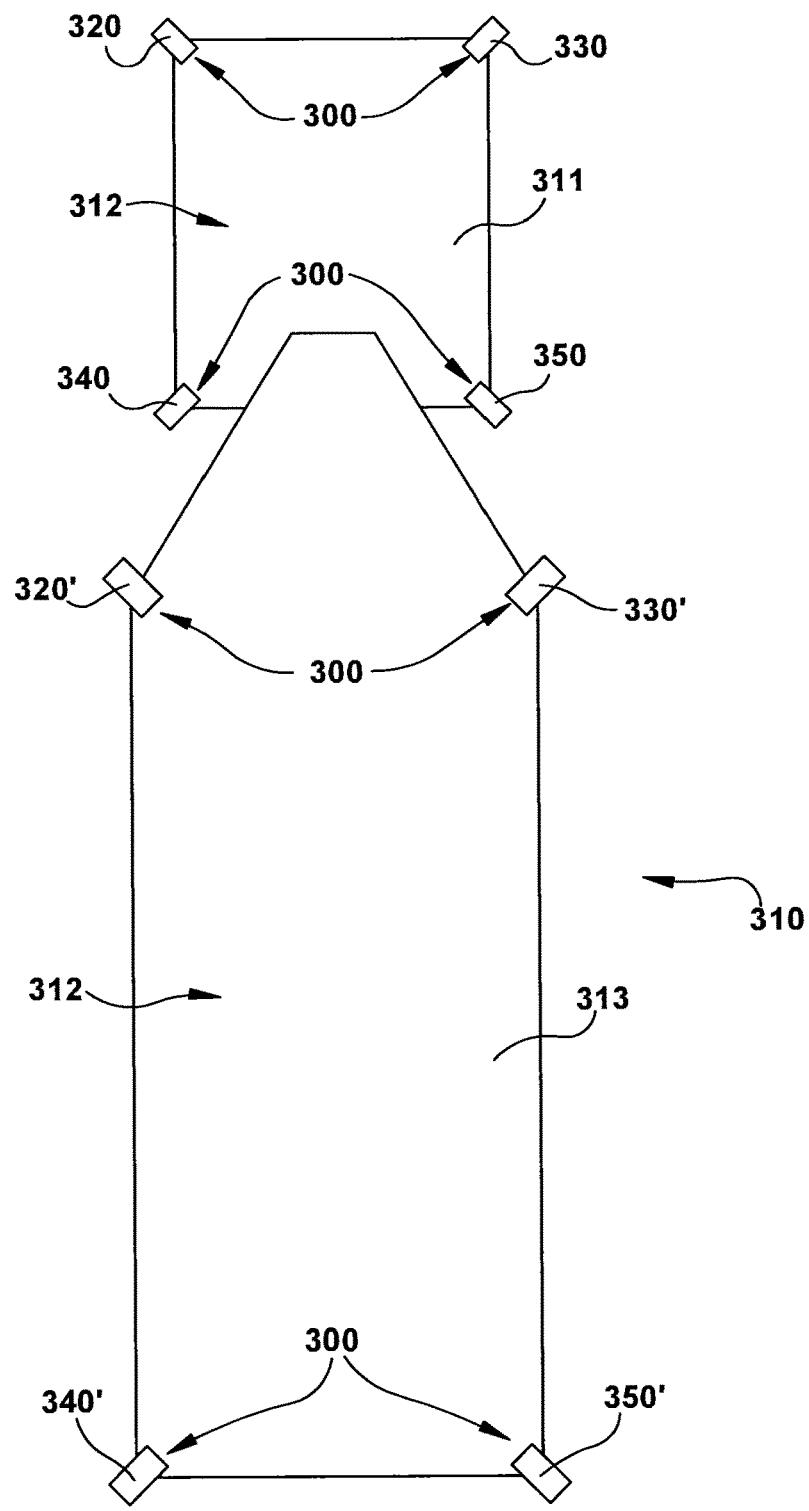
FIG. 3a is a top plan view of a tractor trailer vehicle in which a 360° surround view system according to a further embodiment is applied, showing an installation condition of each camera being located at corners of each of the nominally rectangular tractor and trailer portions of the vehicle.

Further representative of the embodiments herein and with reference in particular next to FIG. 3a, the schematic top plan view shown there illustrates a vehicle 310 in which a 360° surround view camera system 300 according to a third example embodiment is applied, showing a first arrangement of cameras 320, 330, 340, and 350 mounted on or otherwise attached with a tractor portion 311 of a tractor trailer vehicle 312, and a second arrangement of cameras 320', 330', 340', and 350' mounted on or otherwise attached with a trailer portion 313 of the tractor trailer vehicle 312. FIGS. 3b-3e are schematic plan views showing a field of view of each camera 320, 330, 340, and 350 installed on the tractor portion of the vehicle 310 of FIG. 3a, FIGS. 3f-3i are schematic plan views showing a field of view of each camera 320', 330', 340', and 350' installed on the trailer portion of the vehicle 310 of FIG. 3a, and FIG. 3j is a schematic plan view showing a composite of the fields of view of each camera installed in the vehicle of FIG. 3a put together. Although the tractor and trailer portions of the tractor trailer 312 having nominally rectangular overall shapes is shown as the vehicle 310 in FIGS. 3a-3j, the vehicle 310 can be any other vehicle such as a regular passenger automobile having a set of camera mounts or other similar devices suitable for supporting the cameras 320, 330, 340, 350, 320', 330', 340', and 350' in an elevated position relative to the vehicle 310. Also, the vehicle 310 is configured to be located on and move relative to the ground such as a road surface or a parking lot adjacent other vehicles, loading docks, or the like. In the following explanations, the ground is assumed to be a horizontal plane and the "height" of these cameras indicates a height with respect to the ground.

As shown in FIG. 3a, cameras (image pickup devices) 310, 320, 330, and 350 are mounted at the corners of the tractor portion of the vehicle 310. The first camera 320 is placed for example at the leftmost forward part of the tractor portion of the vehicle 310 and is directed outwardly from the vehicle 310 at an angle of about 15°-45°, the second camera 330 is placed for example at the rightmost forward part of the tractor portion of the vehicle 310 and is similarly directed outwardly from the vehicle 310 at an angle of about 15°-45°, the third camera 340 is placed for example at the leftmost rearward part of the tractor portion of the vehicle 310 and is similarly directed outwardly from the vehicle 310 at an angle of about 15°-45°, and the fourth camera 350 is placed for example at the rightmost rearward part of the tractor portion of the vehicle 310 and is similarly directed outwardly from the vehicle 310 at an angle of about 15°-45°. Similarly, cameras (image pickup devices) 310', 320', 330', and 350' are mounted at the corners of the trailer portion of the vehicle 310. The first camera 320' is placed for example at the leftmost forward part of the trailer portion of the vehicle 310 and is directed outwardly from the vehicle 310 at an angle of about 15°-45°, the second camera 330' is placed for example at the rightmost forward part of the trailer portion of the vehicle 310 and is similarly directed outwardly from the vehicle 310 at an angle of about 15°-45°, the third camera 340' is placed for example at the leftmost rearward part of the trailer portion of the vehicle 310 and is similarly directed outwardly from the vehicle 310 at an angle of about 15°-45°, and the fourth camera 350' is placed for example at the rightmost rearward part of the trailer portion of the vehicle 310 and is similarly directed outwardly from the vehicle 310 at an angle of about 15°-45°. The cameras 320, 330, 340, 350, 320', 330', 340', and 350' simply may be referred to herein and below in this and in the embodiments to be described as the cameras or each camera without necessarily being distinguished from each other.

It is to be appreciated that the cameras 320, 330, 340, 350, 320', 330', 340', and 350' are arranged on the vehicle 310 such that an optical axis of the first camera 320 is directed obliquely downward towards the left and forward direction of the tractor portion of the vehicle 310, an optical axis of the second camera 330 is directed obliquely downward towards the right and forward direction of the tractor portion of the vehicle 310, an optical axis of the seventh camera 340' is directed obliquely downward towards the left and rearward direction of the trailer portion of the vehicle 310, and an optical axis of the eight camera 350' is directed obliquely downward towards the right and rearward direction of the trailer portion of the vehicle 310. It is to be further appreciated that the field of view of each camera, i.e. spatial region of which each camera can capture an image, is generally hemispherical in overall shape and is quite large. More particularly, in the embodiment illustrated, the cameras 320, 330, 340, 350, 320', 330', 340', and 350' each have a field of view of about 270° and are commonly referred to in the industry as "fish eye" lens cameras or imagers. The cameras 320, 330, 340, 350, 320', 330', 340', and 350' may be of the type Blue Eagle DC3K-1-LVD available from Silicon Micro Systems, or any similar cameras available from other sources and having the desired characteristics of the embodiments. In the example embodiment, the downward, somewhat obliquely outward, orientation of the cameras places their best resolved pixels in the area near the vehicle, where interactions with pedestrians, cyclists, other traffic participants, and objects may occur. Many commercially available cameras do not have a square field of view but instead provide a non-square field of view such as, for example, a rectangular field of view producing an image of 800 rows by 1280 columns. It is to be appreciated that the embodiments herein advantageously line the long axis of the image (1280 pixel column in the example) up with the long axis of the vehicle for a more rich and comprehensive image of the areas most relevant to the application.

Figure 3B:
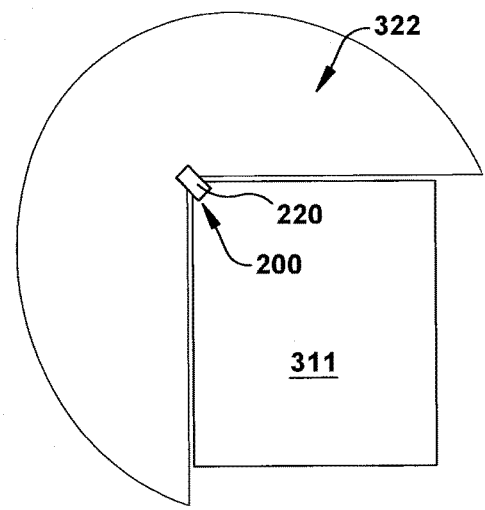
Figure 3C:
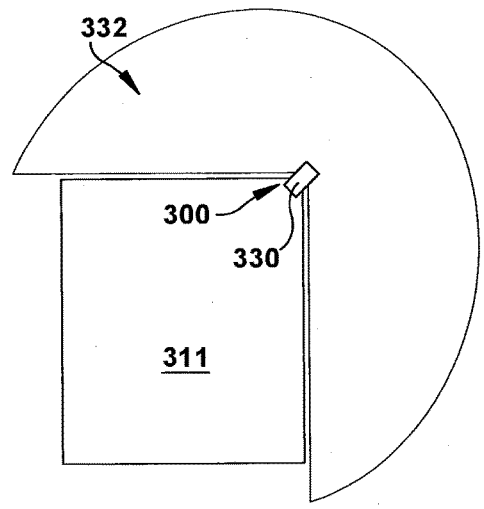
Figure 3D:
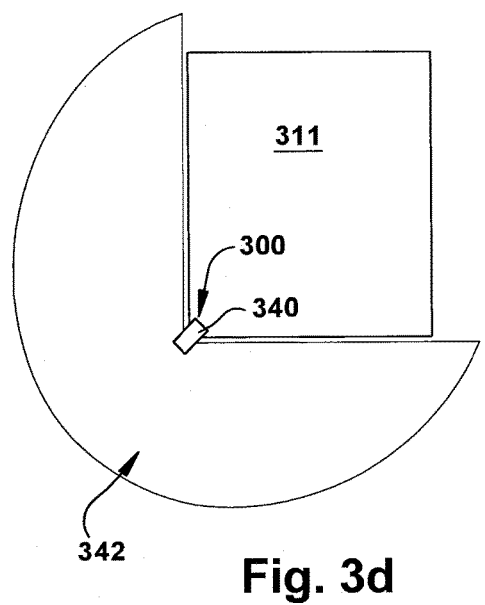
Figure 3E:
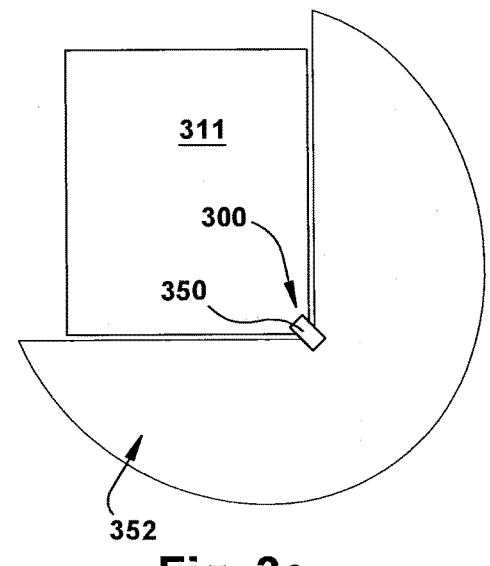

FIG. 3b shows the field of view 322 of the first camera 320 viewed from above, in other words, the generally hemispherical field of view of the left and forward directed first camera as projected onto the generally planar ground surface at the left front of the tractor portion of the vehicle 310. Similarly, FIG. 3c shows the field of view 332 of the second camera 330 viewed from above, in other words, the generally hemispherical field of view of the right and forward directed second camera as projected onto the ground surface at the right front of the tractor portion of the vehicle 310. FIG. 3d shows the field of view 342 of the third camera 330 viewed from above, in other words, the generally hemispherical field of view of the left and rearward directed third camera as projected onto the generally planar ground surface at the left rear of the tractor portion of the vehicle 310. Lastly with regard to the cameras on the tractor, FIG. 3e shows the field of view 352 of the fourth camera 350 viewed from above, in other words, the generally hemispherical field of view of the right and rearward directed fourth camera as projected onto the ground surface at the right rear of the tractor portion of the vehicle 310.

Figure 3F:
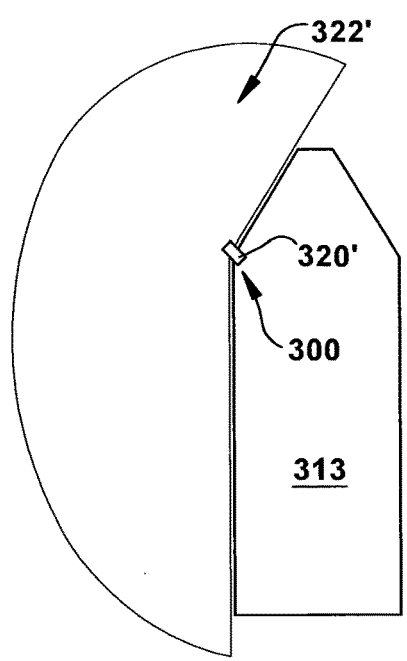
Figure 3G:
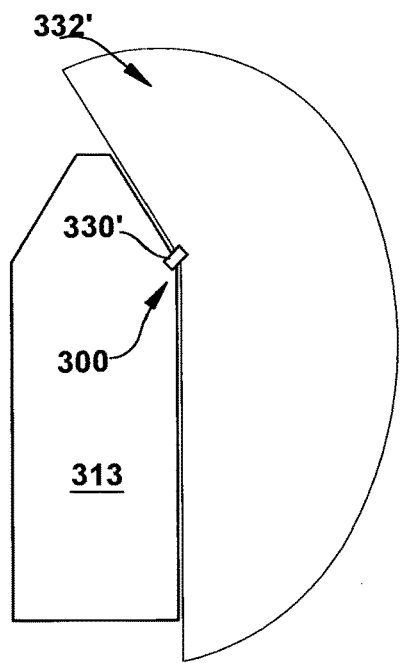
Figure 3H:
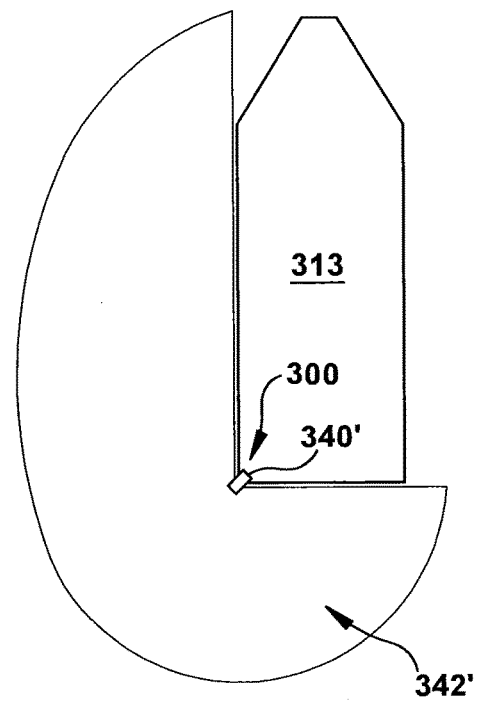
Figure 3I:
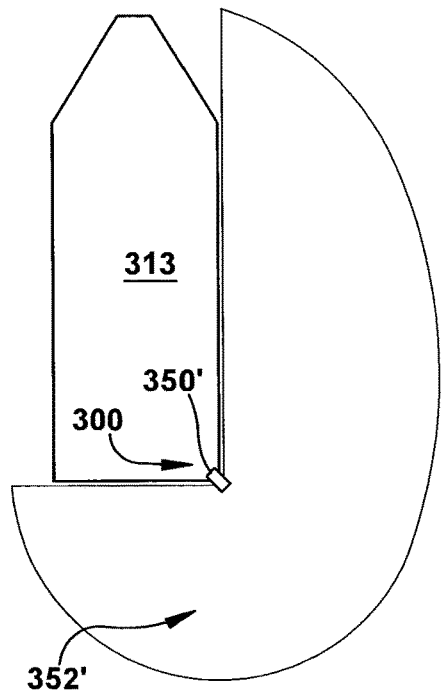
Figure 3J:
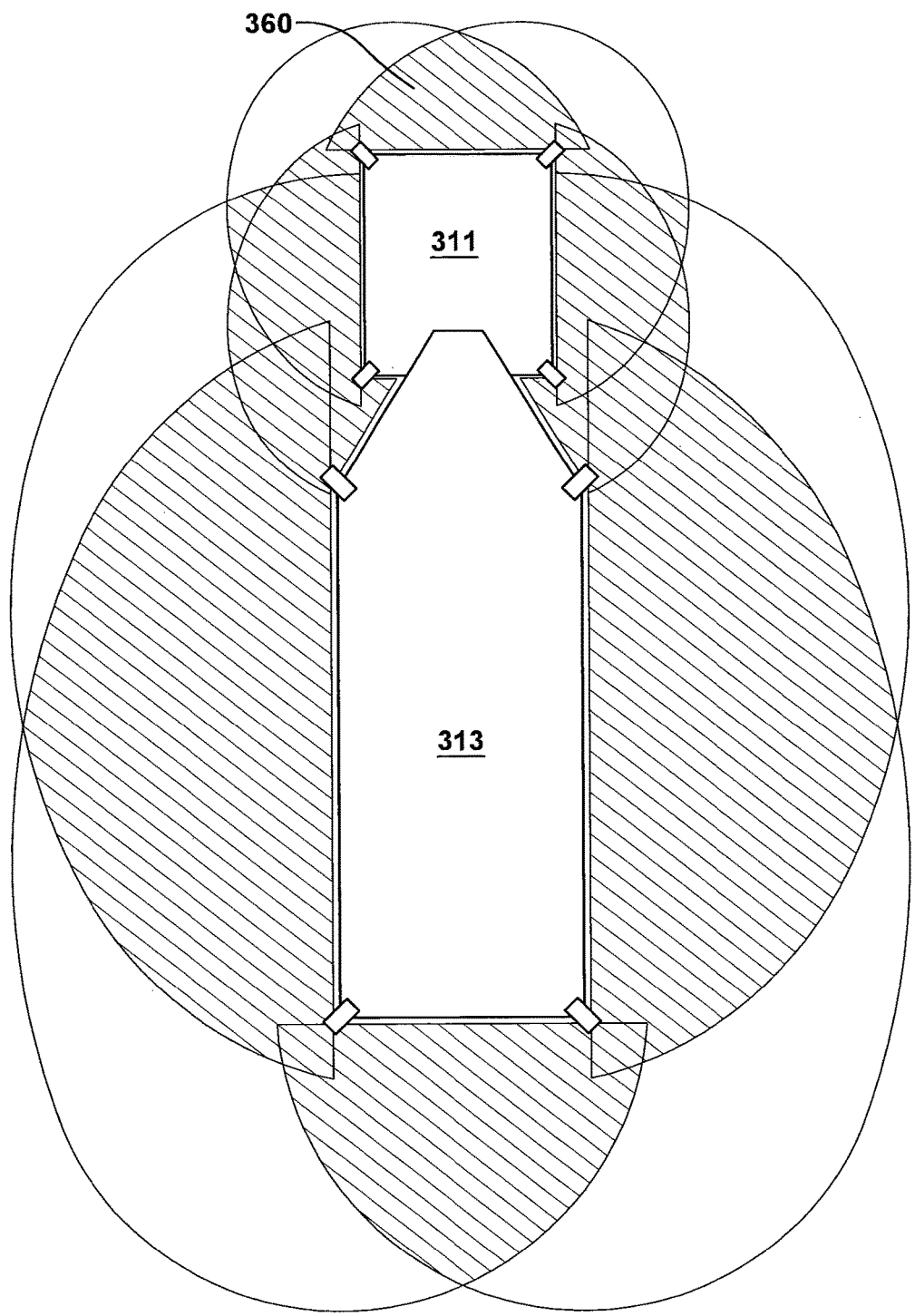
FIG. 3j is a schematic top plan view showing a composite of the fields of view of each camera installed in the tractor trailer vehicle of FIG. 3a put together.

FIG. 3f shows the field of view 322' of the fifth camera 320' viewed from above, in other words, the generally hemispherical field of view of the left and forward directed fifth camera as projected onto the generally planar ground surface at the left front of the trailer portion of the vehicle 310. Similarly, FIG. 3g shows the field of view 332' of the sixth camera 330' viewed from above, in other words, the generally hemispherical field of view of the right and forward directed sixth camera as projected onto the ground surface at the right front of the trailer portion of the vehicle 310. FIG. 3h shows the field of view 342' of the seventh camera 330' viewed from above, in other words, the generally hemispherical field of view of the left and rearward directed seventh camera as projected onto the generally planar ground surface at the left rear of the trailer portion of the vehicle 310. Lastly with regard to the cameras on the tractor, FIG. 3i shows the field of view 352' of the eighth camera 350' viewed from above, in other words, the generally hemispherical field of view of the right and rearward directed eighth camera as projected onto the ground surface at the right rear of the trailer portion of the vehicle 310. FIG. 3j shows a schematic view in which all of the fields of view as shown in FIGS. 3b-3ie are put together. The shaded area in FIG. 3j will be described below.

It is to be appreciated that, in the illustrated embodiment, the left and forward directed first camera 320 primarily captures an image of a subject or object, including the road surface, located within a predetermined region in front and to the left of the vehicle 310. Further, the right and forward directed second camera 330 primarily captures an image of a subject or object, including the road surface, located within a predetermined region in front and to the right of the vehicle 310. Still further, the left and rearward directed seventh camera 340' primarily captures an image of a subject or object, including the road surface, located within a predetermined region in the rear and to the left of the vehicle 310. Yet still further, the right and rearward directed eighth camera 350' primarily captures an image of a subject or object, including the road surface, located within a predetermined region in the rear and to the right of the vehicle 310. The fields of view 322, 332, 342', and 352' of the cameras 320, 330, 340', and 350' however, overlap at a predetermined region 360 substantially surrounding the vehicle 310. This region will be referred to in this embodiment and in other embodiments herein as a common or overlapping field of view. In FIG. 3j, the common fields of view are shown as the shaded area. In this embodiment, overall, the fields of view 322, 332, 342', and 352' overlap at a common or overlapping field 360 essentially forming a complete ring around the vehicle from corner to corner including views directed towards the obliquely left-forward of the vehicle 310; towards the obliquely right-forward of the vehicle 310; towards the obliquely left-backward of the vehicle 310; and towards the obliquely right-backward of the vehicle 310.

Figure 3K:
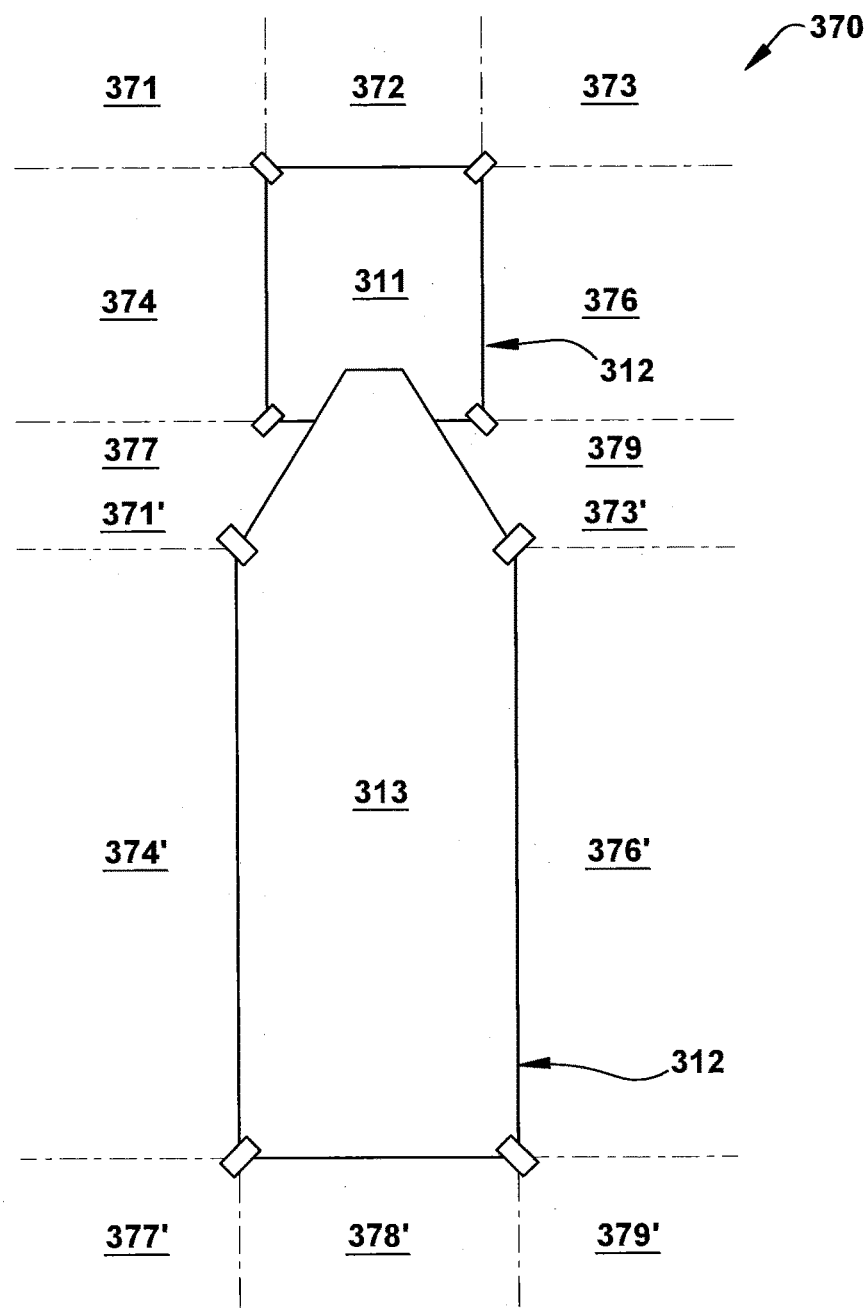

FIG. 3k is a schematic top plan view showing a set 370 of imaging areas 371-374, 376-379, 381-384 and 371'-374', 376'-379', 381'-384' resulting from the arrangement of cameras 320, 330, 340, 350, 320', 330', 340', 350' supported at the selected positions on the body 311, 313 of the vehicle 310 as shown in FIGS. 2a-2f. With reference now to that Figure, the first camera 320 is configured by its orientation, and optical and other characteristics to directly image the imaging areas 371, 372, 373, 374, and 377 of the set 370 of imaging areas. Similarly, the second camera 330 is configured by its orientation, and optical and other characteristics to directly image the imaging areas 371, 372, 373, 376, and 379 of the set 370 of imaging areas. The third camera 340 is configured by its orientation, and optical and other characteristics to directly image the imaging areas 371, 374, 377, 378, and 379 of the set 370 of imaging areas. Lastly, the fourth camera 350 is configured by its orientation, and optical and other characteristics to directly image the imaging areas 373, 376, 377, 378, and 379 of the set 370 of imaging areas.

In addition and as described above, the fields of view 322 and 332 of the first and second cameras 320, 330 overlap at a forward region relative to the vehicle 310, the fields of view 332 and 352 of the second and fourth cameras 330, 350 overlap at a rightward region relative to the vehicle 310, the fields of view 322 and 342 of the first and third cameras 320, 340 overlap at a leftward region relative to the vehicle 310, and the fields of view 342, 352 of the third and fourth cameras 340, 350 overlap at a rearward region relative to the vehicle 310.

Accordingly, all of the imaging areas 371-374, 376-379, 371'-374' and 376'-379' are areas of the set 370 of imaging areas that are imaged by at least two (2) of the cameras 320, 330, 340, 350, 320', 330', 340', 350', thereby providing the continuous region 360 of overlapping fields of view substantially surrounding the vehicle 310. That is, the images obtained by the cameras 320, 330, 340, 350, 320', 330', 340', 350' overlap in all of these regions.

FIG. 4 illustrates an example of a computer system 400 upon which an example embodiment may be implemented. Computer system 400 is suitable for implementing the functionality of any of the surround view camera systems 100, 200, 300 described herein in FIGS. 1a, 2a, and 3a.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, SD memory and/or flash storage, is provided and coupled to bus 402 for storing information and instructions.

Computer system 400 may be coupled via bus 402 to a user interface 411. The user interface 411 may comprise a display 412, such as a cathode ray tube (CRT) or liquid crystal display (LCD), for displaying information to a user of the vehicles 100, 200, 300 described above in connection with the example embodiments. The user interface 411 may further comprise an input device 414, such as a keyboard including alphanumeric and other keys is coupled to bus 402 for communicating information and command selections to processor 404. Another type of user input device is cursor control 416, such as a mouse, a trackball, cursor direction keys, and/or a touchscreen for communicating direction information and command selections to processor 404 and for controlling cursor movement on display 412. This input device typically has two degrees of freedom in two axes, a first axis (e.g., x) and a second axis (e.g., y) that allows the device to specify positions in a plane.

An aspect of the example embodiment is related to the use of computer system 400 to implement the vehicle 360° surround view camera systems of the example embodiments herein to provide a bird's eye view of a continuous region surrounding a vehicle such as a cargo truck, and to provide a system and methods for calibrating such 360° surround view camera systems. According to an example embodiment, vehicle 360° surround views and calibration steps are provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media include, for example, optical or magnetic disks, such as storage device 410. Volatile media include dynamic memory, such as main memory 406. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a VPN link 420 that is connected to an Enterprise (or other predefined network 422. In an example embodiment, VPN link 420 is a wireless link. The communication interface 418 also provides a two-way data communication coupling the computer system 400 with a video link 430 that is connected with a camera set 432 including two (2) of more cameras. In the example embodiments herein, the two (2) of more cameras include for example cameras 120, 130, 220, 230, 240, 250, 220', 230', 240', and 250'.

Figure 5:
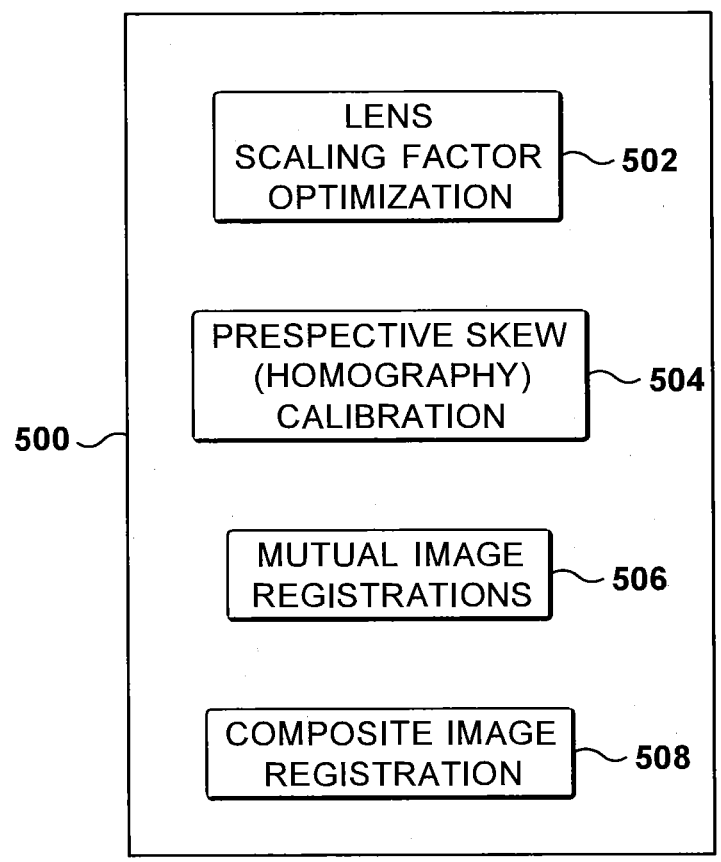
FIG. 5 is a block diagram of a set of code modules stored in a memory of the computer system of FIG. 4 and executable by a processor of the computer system for optimizing and calibrating the cameras of the 360° surround view system and registering the camera images according to example embodiments.

FIG. 5 is a block diagram of a processing module set 500 including a lens distortion scaling optimization module 502, a perspective skew calibration module 504, a mutual image registration module 506 for registration of images that at least partially overlap, and a composite image registration module 508 for collective registration of the composite of images forming a bird's eye view surrounding a vehicle in accordance with the embodiments herein. Each of the modules 502, 504, 506, 508 is executable by the processor described above in connection with FIG. 4. In accordance with the example embodiments, the processor of the surround view camera systems 100, 200, 300 is configured to execute software code in the form of a lens distortion scaling optimization module 502 for individually calibrating each of the cameras to correct their respective fish eye distortion and/or image bowing caused by the inherent physical construction and other intrinsic one or more properties of the fish eye cameras used in the example embodiments. In accordance with one example, the processor of the surround view camera systems 100, 200, 300 executes the lens distortion scaling optimization module 502 for making adjustments to nominal lens distortion parameter values provided by a manufacturer of the fish eye cameras of the embodiments herein.

In accordance with the example embodiment, the processor of the surround view camera systems 100, 200, 300 is further configured to execute code in the form of the perspective skew calibration module 504 for determining and adjusting camera parameters in the form of a homography matrix of parameters using techniques and method steps to be described in greater detail below.

The mutual image registration module 506 is executable by the processor described above in connection with FIG. 4 in a manner to be described in greater detail below for providing best fit registration between images having overlapping regions obtained by adjacent camera pairs arranged at selected position on the vehicle specifically to obtain the overlapping views. The images obtained from each camera pair are optimized for best fit registration in the mutual image registration module 506 and, thereafter, a collective registration of the composite of images forming a bird's eye view surrounding the vehicle is optimized in the composite image registration module 508 in accordance with the embodiments herein.

Figure 6:
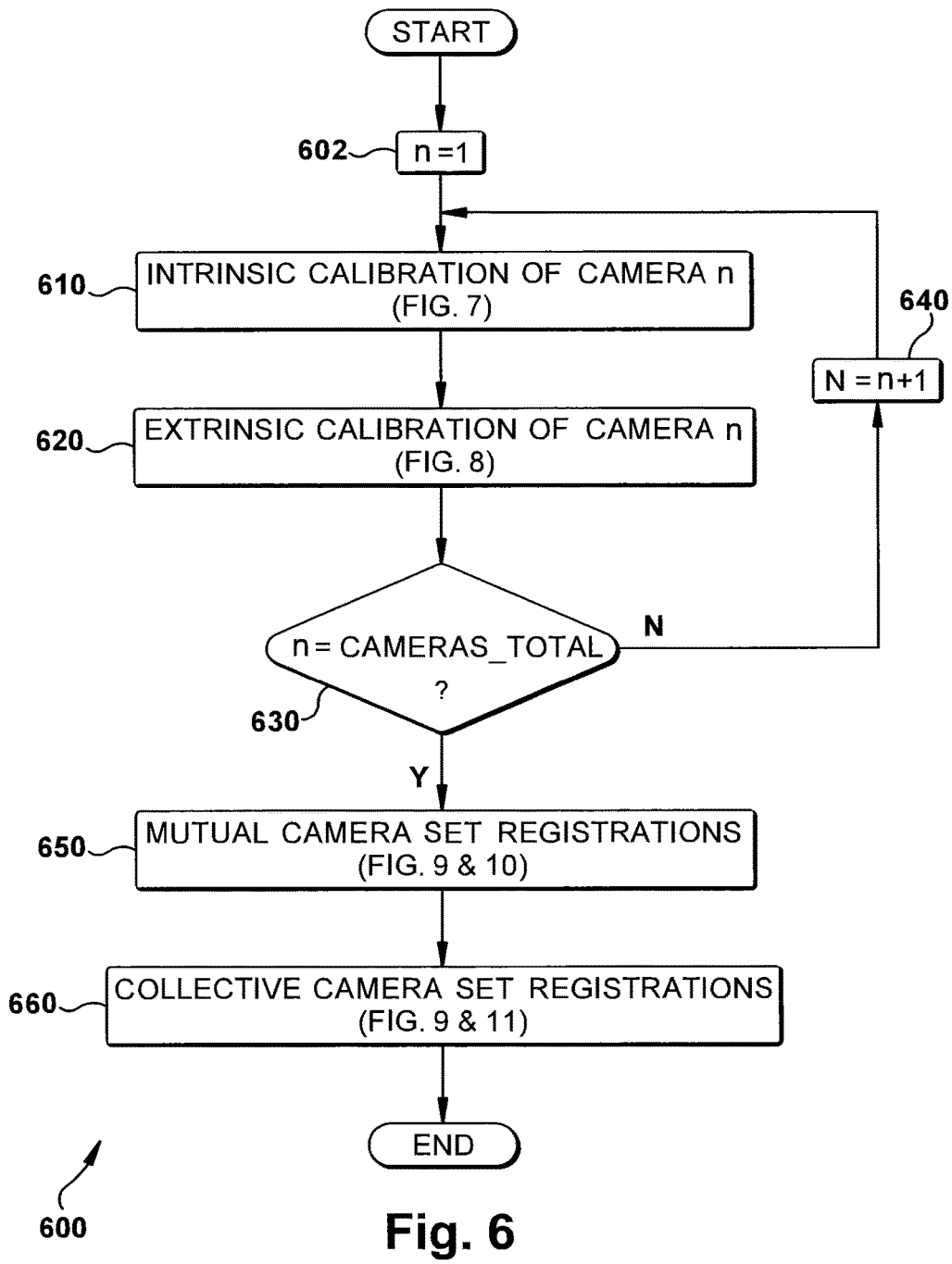
FIG. 6 is a flow chart illustrating an overall method of optimizing, calibrating, and registering the images of the cameras of the 360° surround view systems of the example embodiments.

In view of the foregoing structural and functional features described above, a methodology 600 in accordance with an example embodiment will be better appreciated with reference to FIG. 6. While, for purposes of simplicity of explanation, the methodology 600 of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology 600 in accordance with the example embodiments. The methodology 600 described herein is suitably adapted to be implemented in hardware, software, and/or any one or more combination(s) thereof. For example, the methodology 600 may be implemented by logic and/or by computer system 400 (FIG. 4) in any or all of the surround view camera systems 100, 200, 300 described above.

In general, surround views systems give a vehicle driver a display of the environment around a vehicle. Multiple cameras are used to produce this view, first with adjacent images having overlapping regions being "stitched" together, then with the overall registration of the composite image being optimized. In accordance with the example embodiments herein and for best view quality and obstacle detection performance, the systems and methods herein provide enhanced calibration of the two or more cameras disposed on the vehicle and coupled with the surround view camera systems described above.

Overall, in the embodiments herein, the surround view cameras include fish eye lenses which, on one hand, provide very wide fields of view such as, for example, in the range of full 360°. However, fisheye lenses typically introduce some distortion into the image obtained using these lenses because of their intrinsic physical properties. In addition, since the cameras are mounted on the vehicles with an outwardly directed orientation and angled about 15°-45° from true vertical, the images produced by the cameras offer a perspective skewed view of the area being imaged. Accordingly, some amount of perspective skew distortion is naturally introduced into the images obtained by cameras that are directed obliquely relative to a ground plane as in the embodiments herein. However, in accordance with the example embodiments herein, both the intrinsic fish eye distortion caused generally by the physical characteristics of the cameras, as well as skewed perspective view distortion generally caused by the physical camera orientations relative to the ground surrounding the vehicles, are corrected and adjusted to generate an optimized image providing a straight downward-looking bird's eye view to be rendered for visual recognition by an operator of a vehicle 110, 210, 310 such as, for example, on a display screen 412 or the like.

In accordance with a method for calibrating the surround view camera systems described above, the calibration system of FIG. 4 performs a calibration method 600 such as shown in FIG. 6. The calibration method 600 comprises a step 610 of calibrating individual cameras within the overall surround view camera system 100, 200, 300 to compensate for intrinsic characteristics of the cameras, and a step 620 for calibrating individual cameras within the overall surround view camera system 100, 200, 300 to compensate for extrinsic characteristics of the cameras. The method begins at step 602 whereat an initialization counter n is set. Thereafter at step 610, the first camera (camera$_n$, where n=1) of the set of cameras is individually calibrated to compensate for the intrinsic characteristics of the camera$_n$ and, at step 620, the first camera (camera$_n$, where n=1) of the set of cameras is individually calibrated to compensate for its extrinsic characteristics. At step 630 the initialization counter n is compared with a parameter CAMERAS_TOTAL representative of a quantity of cameras in the subject surround view camera system. For example, in the embodiment shown in FIGS. 1a-1e, the parameter CAMERAS_TOTAL=2, in the embodiment shown in FIGS. 2a-2g, the parameter CAMERAS_TOTAL=4, and in the embodiment shown in FIGS. 3a-3k, the parameter CAMERAS_TOTAL=8. If the initialization counter n has not yet matched the parameter representative of the total number of cameras within the system, the initialization counter n is incremented at step 640 and the next camera in the set of cameras comprising the surround view camera system is individually calibrated at steps 610, 620. In the example embodiment discussed above in connection with FIGS. 2a-2g, the loop 610, 620, 630, 640 is repeated four (4) times for individually calibrating each of the cameras 220, 230, 240, 250 of the surround view camera system 200 shown there.

With continued reference to FIG. 6, the calibration method 600 further includes a step 650 for calibrating pairs of cameras so that their images properly "stitch" together with a minimum of image overlap artifacts, and a step 660 for collectively calibrating the entire set of cameras as a group. As will be described in greater detail below, after each camera in the overall surround view camera system is calibrated in the loop 610, 620, 630, 640, the overall set of cameras 120, 130 of the first system 100 of the first example embodiment, camera set 220, 230, 240, 250 of the second system 200 of the second example embodiment, and camera set 220, 230, 240, 250, 220', 230', 240', 250' of the third system 300 of the third example embodiment, is calibrated collectively. This collective calibration reduces the small errors occurring in the individual camera calibrations, and better registers the camera views to each other.

Figure 7:
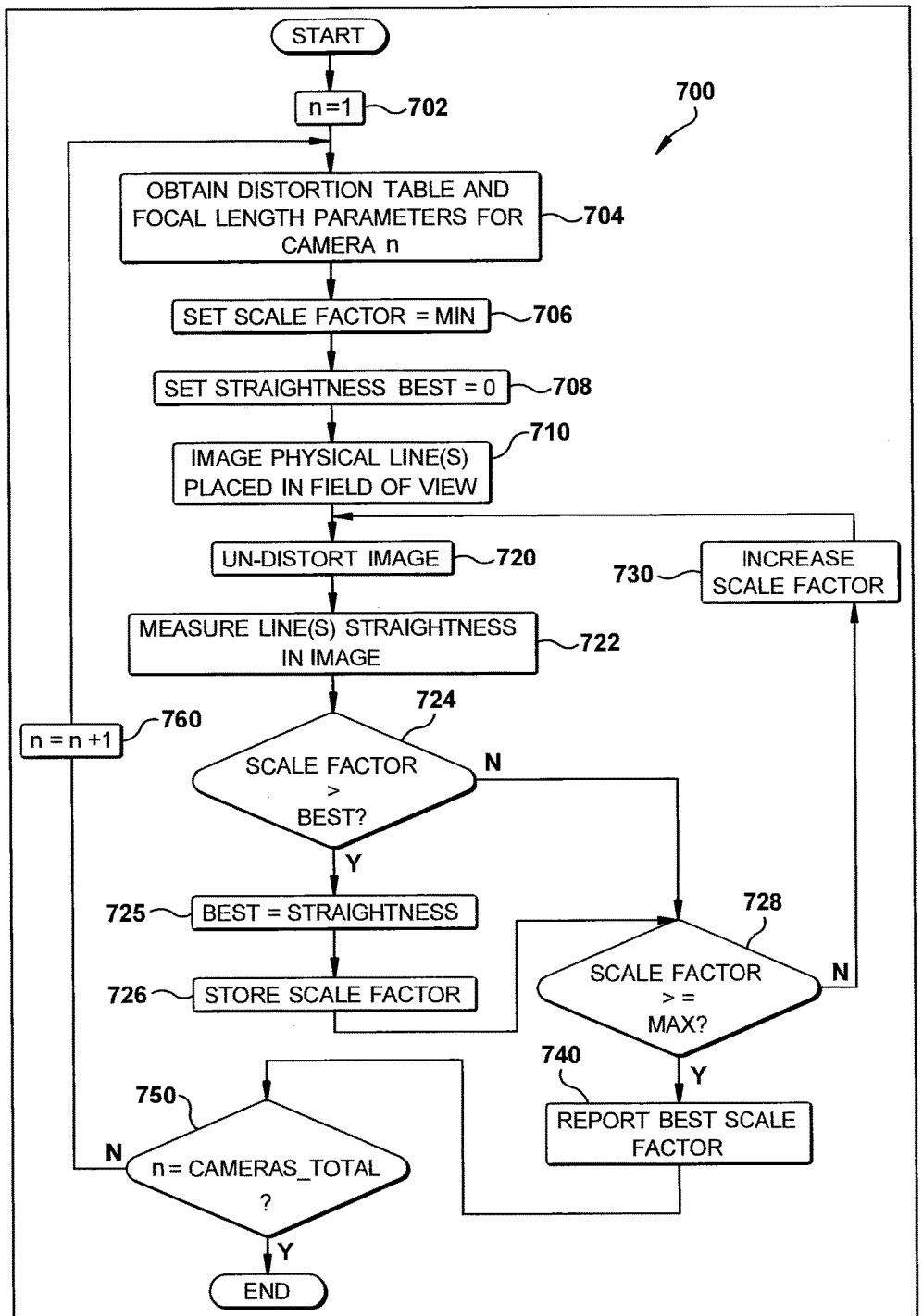
FIG. 7 is a flow chart illustrating a portion of the method of FIG. 6 for iterative intrinsic calibration of individual cameras of the 360° surround view systems of the example embodiments by optimizing lens distortion characteristic scaling factors of the cameras.
Figure 7A:
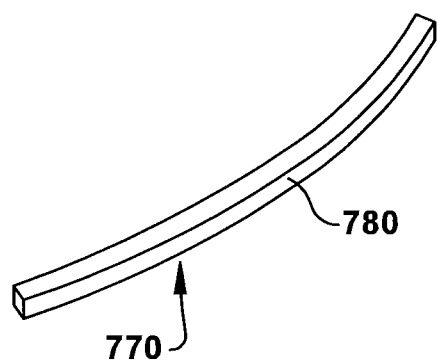
FIGS. 7a-7c are schematic perspective views of an image of a straight object illustrating a progression of the lens distortion optimization set out in FIG. 7.
Figure 7B:
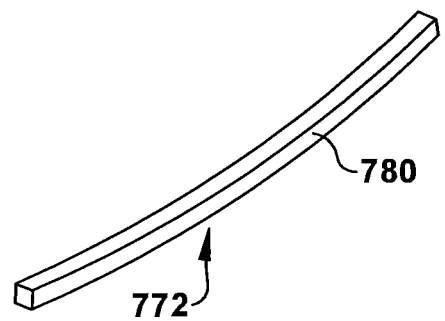
Figure 7C:
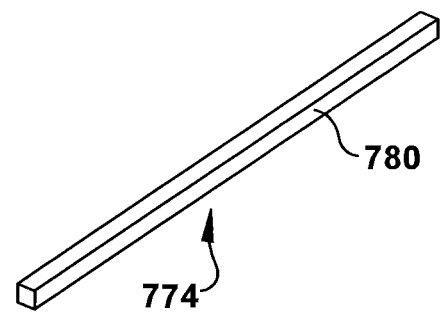

FIG. 7 is a flow chart illustrating a method for individually calibrating the cameras of the surround view camera system in accordance with an embodiment to determine an optimal lens distortion characteristic scaling factor for each camera. FIGS. 7a-7c are schematic perspective views of an image of a straight object illustrating a progression of the optimization set out in FIG. 7. As described, the image of fish-eye lenses is distorted. The distortion can be calculated or characterized from the connection between the undistorted and the distorted field angle. The field angle is the angle formed between a light ray and the optical axis of the lens. Fisheye lenses accept incoming light rays from a typically hemispherical area, and strongly bend them inward, toward the optical axis, so as to project the hemisphere onto the imager. The relationship between the incoming light ray field angle and the outgoing light field angle is nonlinear, with large incoming field angles being bent more than small ones. Lens manufacturers typically provide a nominal lens distortion characteristic, as:

outgoing field angle=function(incoming field angle).

In accordance with the example embodiments herein, a scale factor which compensates for lens variations and adjusts for the lens variations, is added to this equation, as:

outgoing field angle=function(scale factor*incoming field angle).

Accordingly, the new lens characteristic is derived or otherwise calculated or determined in the computer system 400 (FIG. 4) from the multiplication of the original lens characteristic and the scale factor of the incoming field angle.

With reference next therefore to the method 700 illustrated in FIG. 7, at step 702, an initialization parameter n is set to one (1), and a distortion table is obtained for the camera$_n$ at step 704. Typically, the distortion table parameter is available from the camera manufacturer and, in accordance with the example embodiment, is stored in the memory 410 of the system 400. A scale factor parameter is set to an initialization value MIN at step 706 and a best straightness parameter is set to an initialization value=0 at step 708. A straight physical object 780 is placed in the field of view of the camera$_n$ and an image is obtained of the straight physical object 780. FIG. 7a shows an uncompensated image 770 of the straight physical object 780.

Overall, the amount of distortion depends on the properties of the individual lens. The first calibration is, in accordance with the example embodiments herein, the optimization of a distortion characteristic scaling factor, combined or otherwise followed by perspective skew (aka homography) removal to be described in greater detail below. The method 700 at step 720 un-distorts the image using the nominal lens distortion characteristic of the subject camera$_n$. A measure of straightness in the electronic image is determined or otherwise obtained in step 722.

At step 724 the measure of straightness in the electronic image determined in step 722 is compared against a predetermined threshold value BEST of the previously determined measure of straightness in the electronic image and stored in the memory 410 of the system 400 (FIG. 4). A least square fit approach may be used for example for determining differences in the image obtained and the anticipated straight lines mapped into the image wherein differences between the mapped straight lines and the actual image obtained are used to deduce the error value parameters. Other one or more methods may be used as well. If the straightness metric is improved at step 720 relative to the previous image processed for distortion at step 720, the predetermined threshold value BEST is set at step 725 to the straightness value measured at step 722. Thereafter, at step 726 the scale factor that produced this hitherto best straightness value is stored. In either case resulting from the decision block 724, the scale factor is compared in step 728 against a predetermined scaling factor MAX for the lens distortion characteristic stored in the memory 410 and, if the predetermined scaling factor MAX is exceeded, the hitherto best scale factor determined is reported as the best scale factor at step 740 or otherwise simply stored in the memory 410 for use in obtaining further images with the camera$_n$. If on the other hand the predetermined scaling factor MAX is not exceeded, the scale factor is increased at step 730 with typical step sizes of 0.001 to 0.005, and the loop 720, 722, 724, 726, 728 is repeated, wherein FIGS. 7a-7c are schematic perspective views of an image of a straight object illustrating a progression of the optimization method 700 set out in FIG. 7. FIG. 7a shows an uncompensated image 770 of the straight physical object 780, and FIGS. 7b, 7c show first and second compensated images 772, 774 of the straight physical object 780 resulting from successive repetition of the loop 720, 722, 724, 726, 728. It is of course to be appreciated that the method 700 is performed for each of the cameras of the system 200. Scaling factors are values near 1.0, which corresponds to using the nominal lens distortion, and varying by a few percent, typically +/−1 or 2%.

Following the hitherto best scale factor determined being reported as the best scale factor at step 740, a determination is made at step 750 whether all of the cameras in the subject surround view camera system have been individually optimized. More particularly, the initialization value n is compared with the parameter CAMERAS_TOTAL representative of the total number of cameras in the overall surround view camera system. For example, in the embodiment shown in FIGS. 1a-1d, the parameter CAMERAS_TOTAL=2, in the embodiment shown in FIGS. 2a-2f, the parameter CAMERAS_TOTAL=4, and in the embodiment shown in FIGS. 3a-3j, the parameter CAMERAS_TOTAL=8. At step 760, the initialization value n is incremented and the loop comprising steps 720, 730 and 740 is repeated until each camera has been individually optimized. In the example embodiment discussed above in connection with FIGS. 2a-2d, the loop 720, 730 and 740 is repeated four (4) times for individually calibrating the lens distortion scaling factor for each of the cameras 220, 230, and 250 of the surround view camera system 200 shown there.

Figure 8:
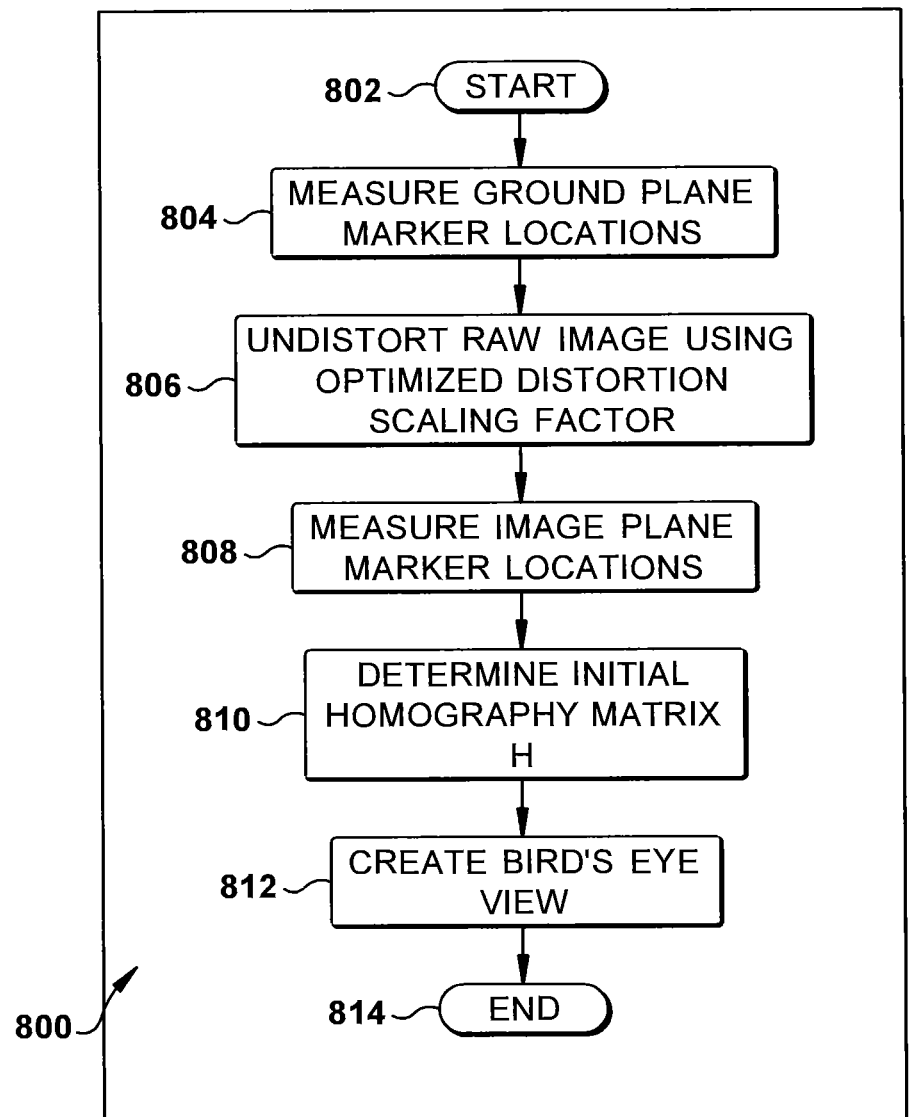
FIG. 8 is a flow chart illustrating a portion of the method of FIG. 6 for iterative extrinsic calibration of individual cameras of the 360° surround view systems of the example embodiments by optimizing homography matrix parameters of the cameras.
Figure 8A:
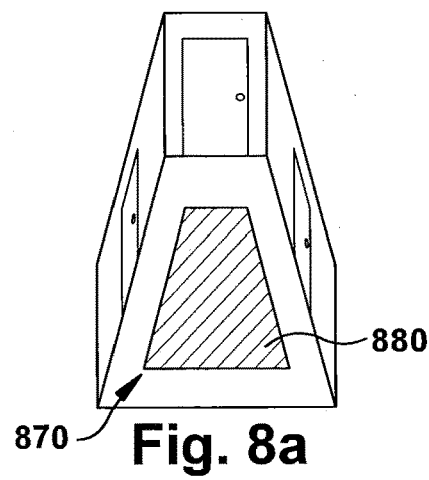
FIGS. 8a-8c are schematic perspective views of an image of a square object disposed on the floor of a fictitious hallway graphically illustrating in simple terms a progression of the skew distortion optimization set out in FIG. 8.
Figure 8B:
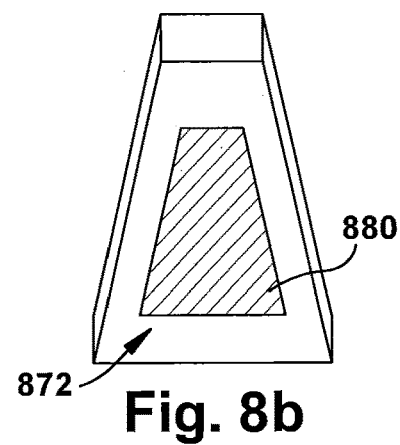
Figure 8C:
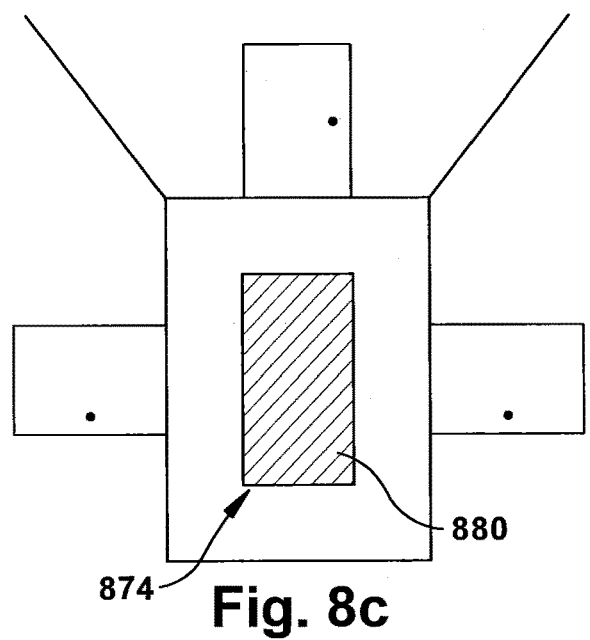

FIG. 8 is a flow chart illustrating a method 800 performed by the system 400 in accordance with an embodiment for calibrating the homography matrix parameters of the individual cameras 120, 130 of the first example embodiment, cameras 220, 230, 240, 250 of the second example embodiment, and cameras 220, 230, 240, 250, 220', 230', 240', 250' of the third example embodiment. In general, the method 800 performs a calibration process for determining the homography matrix parameters for each camera, wherein the homography matrix H determined separately for each camera provides the least skew error in the resultant image from the respective camera and, ultimately, the least amount of skew between camera pairs in the composite resultant image to be displayed to the operator on the display device 412 such as will be described in greater detail below. FIGS. 8a-8c are schematic perspective views of an image of a square object disposed on the floor of a fictitious hallway graphically illustrating in simple terms a progression of the skew distortion optimization set out in FIG. 8.

With reference now to FIG. 8, the method includes an operation at step 802, of placement of a plurality of physical markers A-D, E-H, S-V, and W-Z on the ground adjacent the vehicle and they are arranged such as shown, for example, in FIGS. 2b-2e. In an example embodiment, the markers include a regular repeating checkerboard type grid pattern, for example. It is advantageous to place the markers at well separated locations in the image, disposed about the optical axis. The markers may be disposed at positions offset or otherwise spaced away from the optical axis of the cameras by predetermined distances best suited for optimal calibration. At step 804, the locations of the ground plane markers A-D, E-H, S-V, and W-Z are physically measured and the positions are recorded and, at step 806, the raw image obtained using a first camera is undistorted using one or more of the optimized distortion characteristic parameters determined by the method 700 described above. The marker locations are measured in the image plane obtained by the first camera obtained at step 808. It is to be appreciated that at least four (4) marker points are used in the example embodiment to ensure proper calibration. In addition, matched filter correlation masks or the like may be used in this process. FIG. 8a shows an uncompensated image 870 of an example of a square physical target object 880 disposed on the floor of a hallway of a building. As can be seen, in the image the target object 880 looks trapezoidal.

Next, at step 810, the initial or a "default" homography matrix for the active camera being calibrated is obtained. In this step, before describing this calibration processing, the use of using the homography matrix for converting an original image to a converted image by the planar projective transformation will be considered. Coordinates at each point on the original image are represented by (x, y) and coordinates of each point on the converted image are represented by (X, Y). The relation between the coordinates (x, y) on the original image and the coordinates (X, Y) on the converted image is expressed by the first of the formulas below using a homography matrix H. The homography matrix H is a 3×3 matrix and each of the elements of the matrix is expressed by $h_1$ to $h_9$. Moreover, $h_9$=1 (the matrix is normalized such that $h_9$=1). From the formula, the relation between the coordinates (x, y) and the coordinates (X, Y) also can be expressed by the following formulas.

$$\begin{pmatrix} X \\ Y \\ 1 \end{pmatrix} = H \begin{pmatrix} x \\ y \\ 1 \end{pmatrix}$$

$$= \begin{pmatrix} h_1 & h_2 & h_3 \\ h_4 & h_5 & h_6 \\ h_7 & h_8 & h_9 \end{pmatrix} \begin{pmatrix} x \\ y \\ 1 \end{pmatrix}$$

$$= \begin{pmatrix} h_1 & h_2 & h_3 \\ h_4 & h_5 & h_6 \\ h_7 & h_8 & 1 \end{pmatrix} \begin{pmatrix} x \\ y \\ 1 \end{pmatrix}$$

$$X = \frac{h_1 x + h_2 y + h_3}{h_7 x + h_8 y + h_9}$$

$$Y = \frac{h_4 x + h_5 y + h_6}{h_7 x + h_8 y + h_9}$$

The homography matrix H is uniquely determined if corresponding relations of the coordinates of four points between the original image and the converted image are known. Once the homography matrix H is obtained, it becomes possible to convert a given point on the original image to a point on the converted image according to the above formulas. In the example embodiments herein an initial or nominal homography matrix H is received and stored in the memory 410 for later improvement by the calibration steps of the example embodiments described below.

With regard to obtaining the initial homography matrix, error values are obtained or otherwise derived related to the homography related error values. In accordance with an example embodiment, a numerical optimization function is performed to find homography matrix values that make the total registration error smaller. In one embodiment, the numerical optimization step includes a Simplex Method to improve the fidelity between the obtained image and square or rectangular templates. During the calculations, the homography matrix values are adjusted in accordance with the result obtained during the numerical optimization. Next, the raw image data is un-skewed with or using the improved homography matrix values. This image is then in turn once again tested against a known regular square or rectangular grid image to determine improved homography related calibration parameter values.

Next, at step 812, an undistorted bird's eye view is generated using the determined homography matrix and optimized lens distortion characteristic parameters.

FIG. 8a shows an uncompensated image 870 of the square physical target object 880, and FIGS. 8b, 8c show first and second compensated images 872, 874 of the square physical object 880 resulting from successive repetition of the loop 814, 816, 820, 822, 824. It is of course to be appreciated that the skew compensation optimization method 800 is performed simultaneously for each of the cameras of the system 200.

FIG. 9 is a flow chart showing a method 900 illustrating in greater detail portions of the calibration method 600 (FIG. 6) for calibrating pairs of cameras 650 so that their images properly "stitch" together with a minimum of image overlap artifacts, and for collectively calibrating the entire set of cameras as a group 660. Turning now to that figure, at step 910, the error of individual camera pairs in the surround view camera system 200 of the example embodiment is determined. Next, at step 920, the summed individual error value for all camera pairs in the surround view camera system is determined. If, at step 930, the overall combined error obtained at step 920 is below a predetermined threshold, the calibration method 900 is concluded at step 950. However, if the error obtained at step 920 is not yet below the threshold value THRESHOLD stored in the memory 412, the homography matrices of all camera pairs are modified or otherwise adjusted at step 940. Thereafter, the individual camera pair error determination at step 910 as well as the combined error determination at step 920 is repeated in an iterative fashion until the overall resultant error of all camera pairs in the system is determined or otherwise realized at or below the threshold the predetermined threshold value at step 930. Alternatively, if a maximum computation time has been reached, the best values for the camera homography matrix values currently available are retained.

Figure 10:
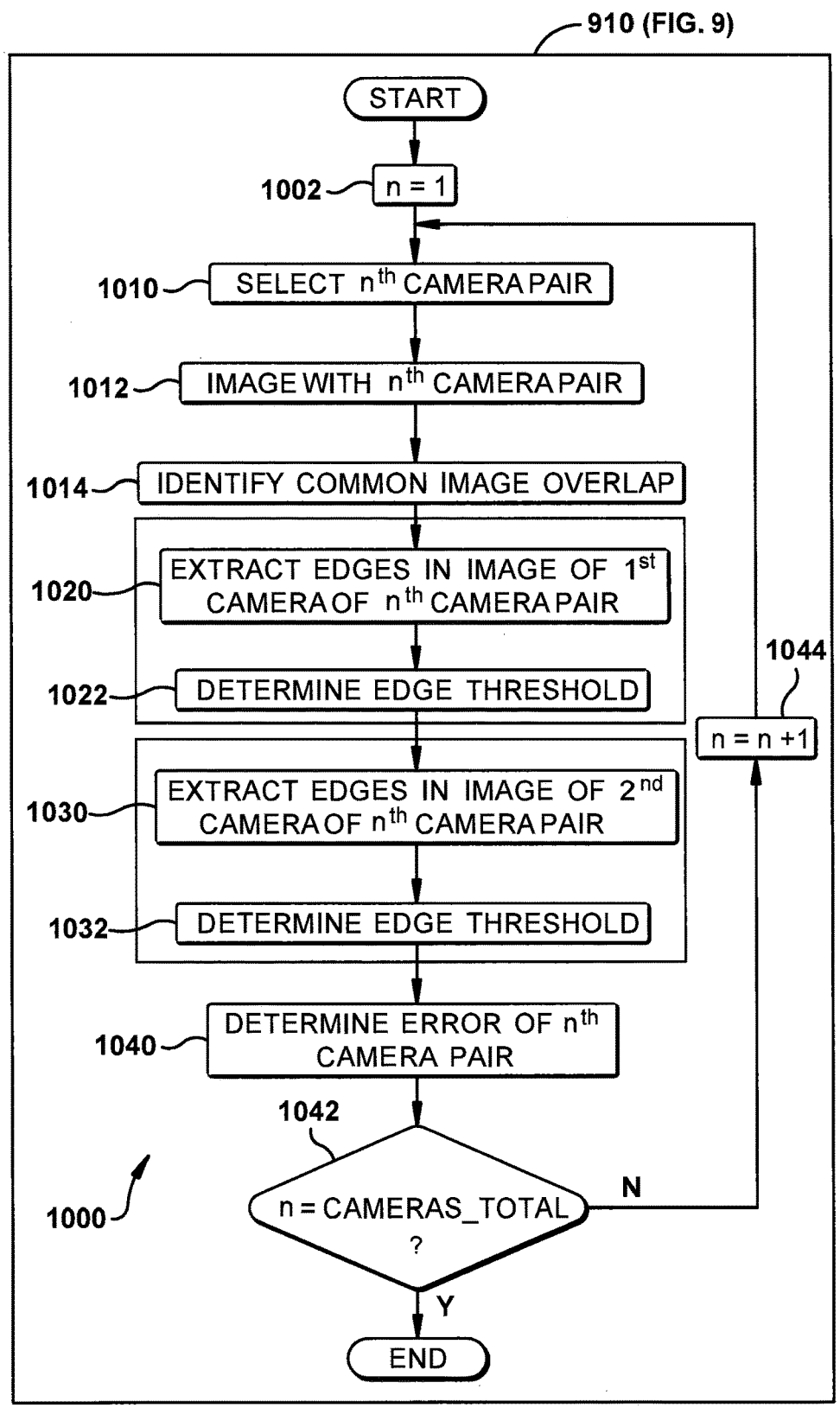
FIG. 10 is a flow chart illustrating a portion of the method of FIG. 9 for determining imaging errors of single camera pairs of the example embodiments and for optimizing the registration of overlapping images of adjacent camera pairs of the 360° surround view systems of the example embodiments.

FIG. 10 is a flow chart showing a method 1000 illustrating the determination of errors in single camera pairs 910 of FIG. 9 in greater detail. With reference now to that figure, the method 1000 includes setting at step 1002 an initialization value n to a predetermined initialization integer (n=1). Next, at step 1010, the $n^{th}$ camera pair of the plurality of cameras 220, 320, 420, and 520 are selected and, at step 1012 an image is obtained using the $n^{th}$ camera pair. At step 1014, a common image overlap portion is identified between the images obtained using the $n^{th}$ camera pair. FIGS. 10a and 10b illustrate simple examples of a first image 1025 and a second image 1035, each comprising nine (9) edge pixels assigned to logical states of ON ("x") or OFF (blank) wherein the first image 1025 has selected edge pixels registered in the logical ON state including edge pixels at the row/column positions of (1,1), (2,2), (3,1), and (3,3) and the remainder of the edge pixels are registered in the logical OFF state including edge pixels at the (1,2), (1,3), (2,1), (2,3), and (3,2) positions. Similarly, the second image 1035 has selected edge pixels registered in the logical ON state including pixels at the row/column positions of (1,3), (2,1), (2,2), (2,3), and (3,3) and the remainder of the edge pixels are registered in the logical OFF state including edge pixels at the (1,1), (1,2), (3,1), and (3,2) positions. As can be seen, with regard to a simplistic registration example, the edge pixels at the row/column positions of (2,2) and (3,3) are in the same location, so in the example, the match percentage between the first and second images 1025, 1035 is 2/4=50%.

FIG. 10c illustrates a registration of a set of simple images showing a joining of the images away from the seam between the images. As shown the first image 1027 is an image of the letter "A" as is the second image 1037. The images as shown are undistorted and un-skewed and the registration process 1000 works to register the images for coincidence at the seam area between the images as well as in ant areas of overlap between the images. In the example of FIG. 10c, the images are rotated "toward" each other and shifted/translated as necessary to produce an overlapping "A" in the final registration image. In the example embodiment the method 1000 simultaneously adjusts the homography matrices for each of the cameras imaging the "A" to result in a pixel-wise coincidence between the two "A"s in the final, registered image.

Figure 10D:
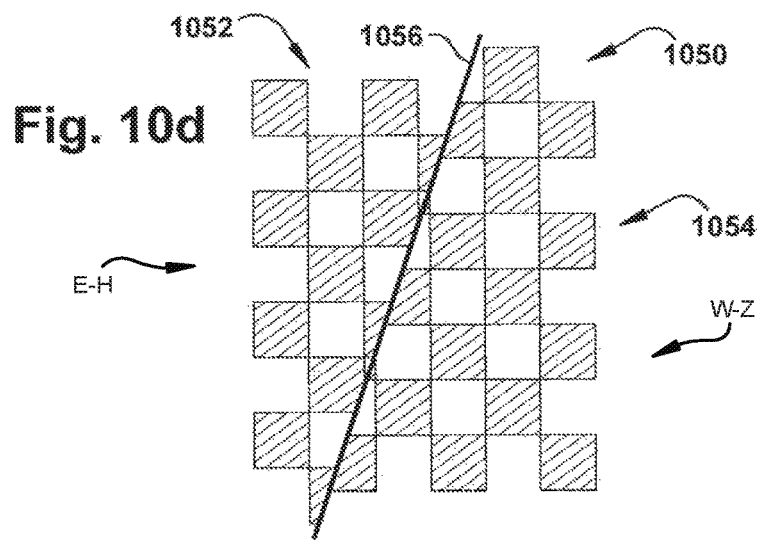
FIGS. 10d-10f illustrates a process of registration of a pair of adjacent images showing a joining at the seam between the images.
Figure 10E:
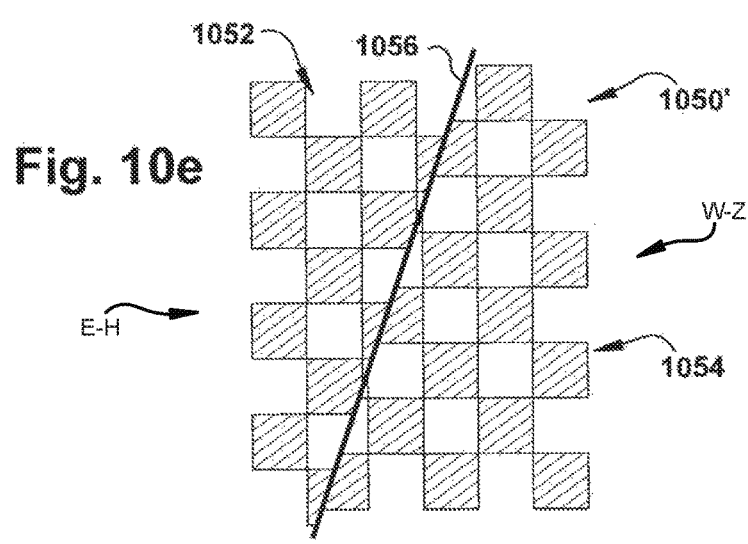
Figure 10F:
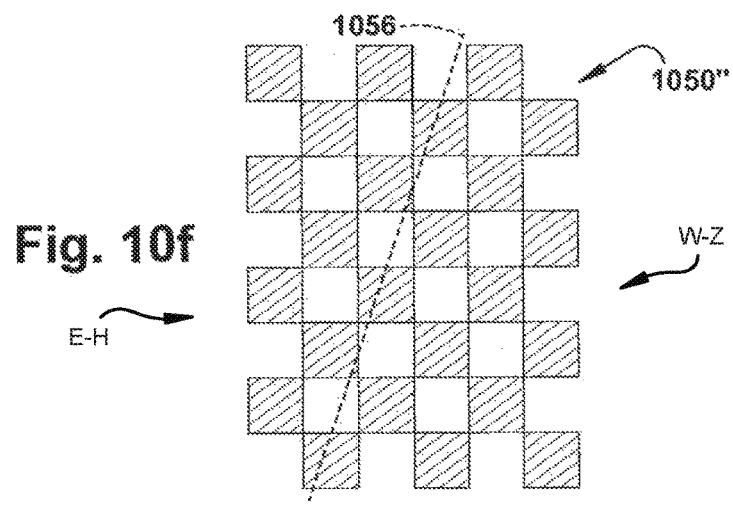

FIGS. 10d-10f illustrates a process of registration of a pair of adjacent images showing a joining at the seam between the images. The Figures illustrate an uncompensated example of a composite image 1050 formed of a pair of images 1052, 1054 obtained for example by adjacent cameras 230, 250 (FIG. 2a) in the overlap region 276 (FIG. 2g). As can be seen, the plurality of physical markers E-H imaged by the second camera 230 and W-Z imaged by the fourth camera 250 are well represented, but the overlap therebetween is maladjusted at a seam 1056.

Next in the method 1000 illustrated in the flow chart of FIG. 10, step 1020 extracts edges from the images and determines edge thresholds for the first camera of the $n^{th}$ camera pair and, similarly, the method includes extracting edges and performing thresholds at step 1032 relative to the second camera of the $n^{th}$ camera pair. The first edge threshold can be determined by standard methods, such as finding a histogram minimum or Otsu's method. More particularly, at step 1020, edges are extracted in the image of the first image of the $n^{th}$ camera pair, and an edge threshold is determined in the image at step 1022. Correspondingly, at step 1030, edges are extracted in the image of the second camera of the $n^{th}$ camera pair and, at step 1032, edge thresholds are obtained in the image of the second camera of the $n^{th}$ camera pair. In accordance with the example embodiments, the edge threshold for the second image is chosen such that as many or slightly more edge pixels are found in the registration area. This slight possible surfeit of edge pixels implies that all the edge pixels of the first image should have matching counterparts when properly registered. That is, the second set of edge pixels should be a superset of the first edge pixel set. A measure that quantifies the number of edge pixels of the first image are matched is therefore appropriate used u in the example embodiments. Thereafter, at step 1040, the error of the first camera pair is determined using techniques, such as, for example, the percentage of pixels overlapping at the same locations, Haussdorf distance, Jacard distance, or similar measures for distances between point sets. Overall, the loop comprising steps 1010-1044 are performed for each pair of cameras in the surround view camera system 200.

FIG. 10e illustrates an example of a composite image 1050' formed by the pair of images 1052, 1054 and compensated by executing the loop comprising steps 1010-1044 on the initial composite image 1050 once. As can be seen, the plurality of physical markers E-H imaged by the second camera 230 and W-Z imaged by the fourth camera 250 remain well represented, and the overlap therebetween is much better adjusted at the seam 1056. Similarly, FIG. 10f illustrates an example of a composite image 1050" formed by the pair of images 1052, 1054 and compensated by executing the loop comprising steps 1010-1044 on the composite image 1050' once further. As can be seen, the plurality of physical markers E-H imaged by the second camera 230 and W-Z imaged by the fourth camera 250 remain well represented, and the seam 1056 at the overlap area is visually non-existent. The registration area is advantageously chosen such that it covers both sides of a possible seam or image stitching location.

Next in the method 1000 of FIG. 10, a determination is made at step 1042 whether all camera pairs of the set of cameras 220, 230, 240 and 250 of the surround view camera system 200 have been processed, and if not, the counter value n is incremented at step 1044. In the example embodiment, for example, the loop is performed for the first and second cameras 220 and 230, for the second and third cameras 230 and 240, for the third and fourth cameras 240 and 250, and for the fourth and first cameras 250 at 220 simultaneously. The simultaneous optimization of the example embodiments herein advantageously considers all camera pair errors, sums the aggregated errors to form a (one) single value whereby any registration or other errors between adjacent camera pairs are prevented from propagating from one camera pair to the next. In other words, registration errors between adjacent cameras are not "stacked" which might possibly result in a diverging optimization solution, but rather the full set of registration errors are simultaneously scaled towards a converging optimization solution.

Although objects having simple overall shapes or having simple patterns thereof or thereon may be used for the registration optimization in accordance with the embodiments herein, it is to be appreciated the use of 1-d objects could introduce some amount of ambiguity into the registration process. That is, 1-d objects could be "slid" along its length and still generate a line in the registration process, albeit a shorter line. Accordingly, 2-d objects are preferred, such as a large "+" symbol, as the different directions carry more registration information.

Figure 10G:
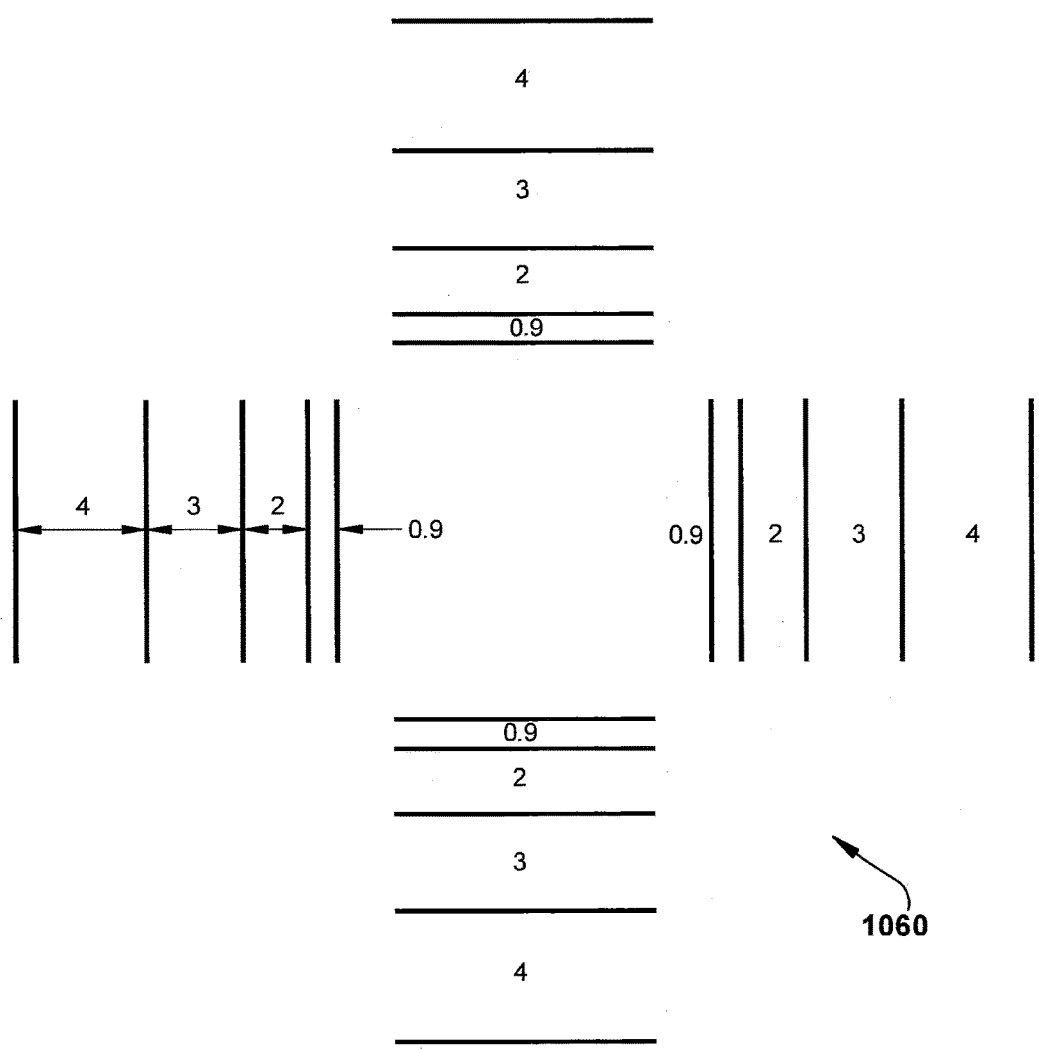
FIG. 10g shows an example of an aperiodic pattern.

Still further, periodic patterns such as simple grids could also introduce some amount of ambiguity into the registration process, since the grid pattern could be slid over two squares and still result in a good fit again in the composite registration. Accordingly, the embodiments herein contemplate the use of non-periodic patterns in the registration optimization processes. FIG. 10g shows an example of such an aperiodic pattern 1060.

Yet still further, color is used in the example embodiments to carry information. A non-periodic, 2-d, multiple of colors object is preferred since it reduced ambiguity in the registration. In this embodiment, the process looks for differences in color between pixels also, giving each pixel more identity than just an edge at some location. The color set is ideally just a few values so that differences in lighting would be accommodated (that is, e.g. dark blue would match a lighter blue).

Figure 11:
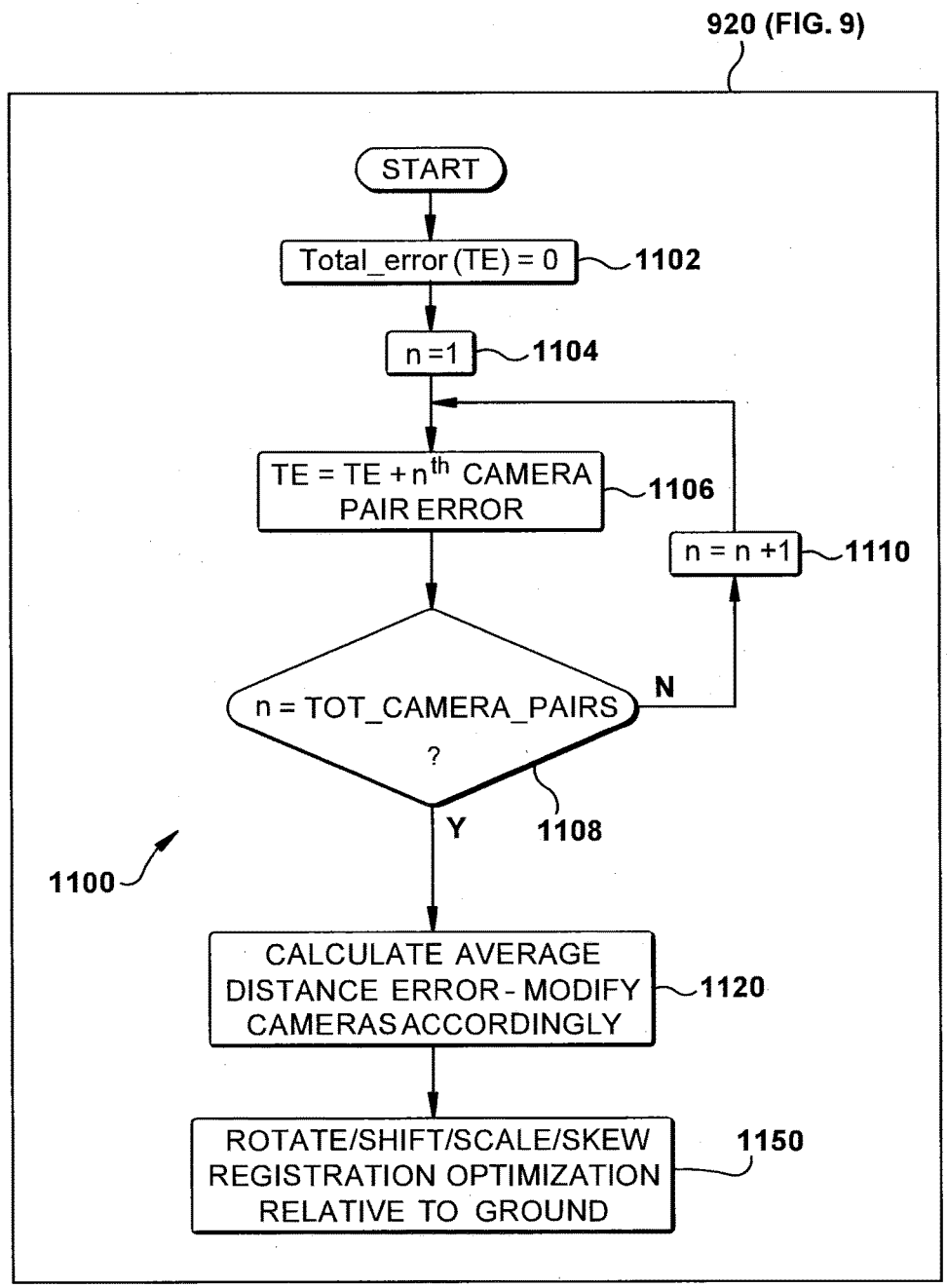
FIG. 11 is a flow chart illustrating a portion of the method of FIG. 9 for determining an overall single imaging error value for all camera pairs for optimizing the collective registration of all of the overlapping images of the cameras of the 360° surround view systems of the example embodiments.

FIG. 11 is a flowchart illustrating a method 1100 for determining a single error value for all camera pairs as illustrated in FIG. 9 at step 920 in greater detail. Turning now to that figure, the method 1100 sets a total error initialization value at 1102 and, further sets a counter initialization at 1104. Thereafter, the total error is added to the $n^{th}$ camera pair error obtained in the method 1000 described above in connection with FIG. 10. A determination is made at step 1108 whether all camera pairs of the set of cameras comprising the surround view camera system 200 have been processed and, if not, the loop counter is incremented at step 1110. Otherwise, if all camera pairs are processed, the average distance is calculated at step 1120. This average error calculated at step 1120 is used to adjust or otherwise modify the homography matrices of all cameras such as described above and shown, for example, at step 940 of FIG. 9.

Lastly and with continued reference to FIG. 11, the method 1100 includes a step 1150 for optimizing the rotation registration of the overall composite image relative to known ground markers, and also for optimizing the shift/translation registration of the overall composite image relative to the known ground markers. Perspective skew and zoom effects may also be accounted for in this final step. FIGS. 11a-11c are schematic views of compensation movement of a composite image 1160 illustrating a progression of the rotation and shift/translation registration optimization set out in step 1150 of FIG. 11. FIG. 11a shows the composite image 1160 rotated counterclockwise and shifted upwardly relative to a reference object and/or marker 1170 having a known shape and location. As shown in FIG. 11b, the method step 1150 is operative to vertically translate the composite image 1160 downwardly to a desired position relative to the known reference object. Further, as shown in FIG. 11c, the method step 1150 is operative to rotate the composite image 1160 clockwise to a desired orientation relative to the known reference object.

In accordance with the embodiments herein, two alternatives exist for calculating the final correction for the now interlocked views. The above has just described an iterative solution, where global numerical optimization is used to reduce the average distance between corresponding true ground to reconstructed ground locations. Alternatively, a single step homography calculation may be used, producing that global homographic mapping which moves markers to their correct position with respect to a physical ground truth. The individually optimized camera homography matrix may be multiplied by the global homography matrix, producing a final, adjusted to the physical ground truth, interlocking bird's eye view.

Overall, therefore, and in accordance with the example embodiments herein, an optimized bird's eye view or 360° surround view imaging system is provided in a vehicle having cameras placed at selected locations on the vehicle. For purposes of describing the overall aspects of the example embodiments only and not for purposes of limiting same, a brief summary of steps for providing an optimized bird's eye view or 360° surround view imaging system and for optimizing or otherwise calibrating the system will be set out immediately below using a simplistic picture puzzle analogy and with reference to FIG. 12. Initially, pictures 1202 of each piece of ground near the cameras are taken using a fisheye lens camera. The first step is to create individual undistorted pieces 1203 from the fish eye views thereof. This is done by using features of a known appearance in each piece, such as straight lines. The second step is to determine the homographic relationship H between this piece 1204, as recreated by the camera and the ground, using markers on the ground. The result is an undistorted projection of the piece 1205, in approximately the correct location and spatial attitude, near or on the ground. The third step is to take these approximately correct projected pieces and lock or register them together A to A, B to B, C to C, and so on, so that they agree with each other 1206. This now locked together puzzle 1206 may be off the ground or displaced from its correct location on the ground. The fourth and final step ensures that these now registered pieces 1208 are in the proper locations on the ground 1209. In the example embodiments, this is accomplished by comparing the locations of markers in the puzzle and on the ground.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

Having thus described the example embodiments, it is now claimed:

1. A method of calibrating an associated imaging system providing a bird's eye view of an area surrounding an associated vehicle, the method comprising:
   receiving first image data, the first image data being related by a first homography matrix to a first image of a first target area adjacent the associated vehicle;
   receiving second image data, the second image data being related by a second homography matrix to a second image of a second target area adjacent the associated vehicle, wherein a portion of the second target area overlaps a portion of the first target area at an overlap area;
   receiving first collective image data, the first collective image data being related by the first and second homography matrices to a composite image of a first plurality of target objects disposed in the overlap area;
   determining a composite registration error between the collective image data and the area surrounding the associated vehicle in accordance with a comparison between locations of images of the first plurality of target objects in the collective image data and known physical locations of the first plurality of target objects in the overlap area; and
   simultaneously modifying the first and second homography matrices as globally modified first and second homography matrices in accordance with the determined composite registration error to register the collective image data with the known physical locations of the plurality of target objects.

2. The method according to claim 1, wherein:
   the receiving the first image data comprises receiving the first image data from a first camera disposed on the associated vehicle, the first camera imaging at least one two-dimensional target object disposed in the overlap area;
   the receiving the second image data comprises receiving the second image data from a second camera disposed on the associated vehicle, the second camera imaging the at least one two-dimensional target object disposed in the overlap area; and
   the determining the composite registration error between the collective image data and the area surrounding the associated vehicle comprises determining a first paired registration error between the first image data and the second image data in accordance with a comparison between portions of a first and second image data representative of an image of the at least one two-dimensional target object disposed in the overlap area.

3. The method according to claim 2, wherein:
   the receiving the first image data from the first camera disposed on the associated vehicle by the first camera imaging the at least one two-dimensional target object disposed in the overlap area comprises the first camera imaging a non-periodic pattern disposed in the overlap area;
   the receiving the second image data from the second camera disposed on the associated vehicle by the second camera imaging the at least one two-dimensional target object disposed in the overlap area comprises the second camera imaging the non-periodic pattern disposed in the overlap area; and
   the determining the composite registration error between the collective image data and the area surrounding the associated vehicle comprises determining the first paired registration error between the first image data and the second image data in accordance with a comparison between portions of a first and second image data representative of an image of the non-periodic pattern disposed in the overlap area.

4. The method according to claim 2, wherein:
   the receiving the first image data from the first camera disposed on the associated vehicle by the first camera imaging the at least one two-dimensional target object disposed in the overlap area comprises the first camera imaging an object presenting a non-periodic two-dimensional arrayed color pattern disposed in the overlap area;

the receiving the second image data from the second camera disposed on the associated vehicle by the second camera imaging the object presenting the non-periodic two-dimensional arrayed color pattern disposed in the overlap area; and the determining the composite registration error between the collective image data and the area surrounding the associated vehicle comprises determining the first paired registration error between the first image data and the second image data in accordance with a comparison between portions of a first and second image data representative of an image of the object presenting a non-periodic two-dimensional arrayed color pattern disposed in the overlap area.

5. The method according to claim 2, further comprising:
calibrating a first distortion characteristic parameter of the first camera to determine a first distortion characteristic scaling parameter for optimizing a linearity of a lens of the first camera; and
calibrating a second distortion characteristic parameter of the second camera to determine a second distortion characteristic scaling parameter for optimizing a linearity of a lens of the second camera.

6. The method according to claim 2, further comprising:
determining the first homography matrix by:
imaging an associated rectangular first calibration object in the first target area by the first camera to obtain a first calibration object image; and
modifying selected parameters of the first homography matrix to minimize an amount of skew in the first calibration object image representative of the associated rectangular first calibration object disposed in the first target area; and
determining the second homography matrix by:
imaging an associated rectangular second calibration object in the second target area by the second camera to obtain a second calibration object image; and
modifying selected parameters of the second homography matrix to minimize an amount of skew in the second calibration object image representative of the associated rectangular second calibration object disposed in the second target area.

7. An apparatus for calibrating an associated imaging system operatively coupled with an associated vehicle and providing a bird's eye view of an area surrounding the associated vehicle, the apparatus comprising:
a communication interface operatively coupled with cameras of the associated imaging system and configured to communicate with the cameras; and
a processor coupled with the communication interface, and configured to:
receive first image data, the first image data being related by a first homography matrix to a first image of a first target area adjacent the associated vehicle;
receive second image data, the second image data being related by a second homography matrix to a second image of a second target area adjacent the associated vehicle, wherein a portion of the second target area overlaps a portion of the first target area at an overlap area;
receive first collective image data, the first collective image data being related by the first and second homography matrices to a composite image of a first plurality of target objects disposed in the overlap area;
determine a composite registration error between the collective image data and the area surrounding the associated vehicle in accordance with a comparison between locations of images the first plurality of target objects in the collective image data and known physical locations of the first plurality of target objects in the overlap area; and
simultaneously modify the first and second homography matrices as globally modified first and second homography matrices in accordance with the determined composite registration error to register the collective image data with the known physical locations of the plurality of target objects.

8. The apparatus according to claim 7, wherein the processor is further configured to:
receive the first image data from a first associated camera disposed on the associated vehicle, the first camera imaging at least one two-dimensional target object disposed in the overlap area;
receive the second image data from a second associated camera disposed on the associated vehicle, the second camera imaging the at least one two-dimensional target object disposed in the overlap area; and
determine a first paired registration error between the first image data and the second image data in accordance with a comparison between portions of a first and second image data representative of an image of the at least one two-dimensional target object disposed in the overlap area.

9. The apparatus according to claim 8, wherein the processor is further configured to:
receive, from the associated first camera, an image of a non-periodic pattern disposed in the overlap area;
receive, from the associated second camera, an image of a non-periodic pattern disposed in the overlap area; and
determine the first paired registration error between the first image data and the second image data in accordance with a comparison between portions of a first and second image data representative of an image of the non-periodic pattern disposed in the overlap area.

10. The apparatus according to claim 8, wherein the processor is further configured to:
receive, from the associated first camera, an image of an object presenting a non-periodic two-dimensional arrayed color pattern disposed in the overlap area;
receive, from the associated second camera, an image of an object presenting the non-periodic two-dimensional arrayed color pattern disposed in the overlap area; and
determine the first paired registration error between the first image data and the second image data in accordance with a comparison between portions of a first and second image data representative of an image of the object presenting a non-periodic two-dimensional arrayed color pattern disposed in the overlap area.

11. The apparatus according to claim 8, wherein the processor is further configured to:
calibrate a first distortion characteristic parameter of the first camera to determine a first distortion characteristic scaling parameter for optimizing a linearity of a lens of the first camera; and
calibrate a second distortion characteristic parameter of the second camera to determine a second distortion characteristic scaling parameter for optimizing a linearity of a lens of the second camera.

12. The apparatus according to claim 8, wherein:
the processor is further configured to determine the first homography matrix by:
imaging an associated rectangular first calibration object in the first target area by the first camera to obtain a first calibration object image; and
modifying selected parameters of the first homography matrix to minimize an amount of skew in the first calibration object image representative of the associated rectangular first calibration object disposed in the first target area; and
the processor is further configured to determine the second homography matrix by:
imaging an associated rectangular second calibration object in the second target area by the second camera to obtain a second calibration object image; and
modifying selected parameters of the second homography matrix to minimize an amount of skew in the second calibration object image representative of the associated rectangular second calibration object disposed in the second target area.

13. A method of calibrating an imaging system providing a bird's eye view of an area surrounding an associated vehicle, the method comprising:
receiving first image data, the first image data being related by a first homography matrix to a first image of a first target area adjacent the associated vehicle;
receiving second image data, the second image data being related by a second homography matrix to a second image of a second target area adjacent the associated vehicle, wherein a portion of the second target area overlaps a portion of the first target area at a first overlap area;
receiving third image data, the third image data being related by a third homography matrix to a third image of a third target area adjacent the associated vehicle, wherein a portion of the third target area overlaps a portion of the second target area at a second overlap area;
receiving fourth image data, the fourth image data being related by a fourth homography matrix to a fourth image of a fourth target area adjacent the associated vehicle, wherein a portion of the fourth target area overlaps a portion of the third target area at a third overlap area, and wherein a portion of the fourth target area overlaps a portion of the first target area at a fourth overlap area;
receiving first collective image data, the first collective image data being related by the first, second, third, and fourth homography matrices to a composite image of a first plurality of target objects disposed in the first, second, third, and fourth overlap areas;
determining a composite registration error between the collective image data and the area surrounding the associated vehicle in accordance with a comparison between locations of images the first plurality of target objects in the collective image data and known physical locations of the first plurality of target objects in the first, second, third, and fourth overlap areas; and
simultaneously modifying the first, second, third, and fourth homography matrices as globally modified first, second, third, and fourth homography matrices in accordance with the determined composite registration error to register the collective image data with the known physical locations of the plurality of target objects.

14. A surround view system generating a bird's eye view of an area adjacent an associated apparatus disposed in an environment, the surround view system comprising:
a computer system comprising a processor;
a non-transient memory operably coupled with the processor; and
a plurality of cameras operatively coupled with the processor and memory, the plurality of cameras being disposed at selected positions on the associated apparatus, each of the plurality of cameras respectively having a field of view projected onto the area adjacent the associated apparatus wherein each field of view overlaps at least one other field of view defining a continuous field of view overlap area completely surrounding the associated apparatus,
wherein the processor is configured to calibrate the plurality of cameras by:
determining a set of registration errors in respective images of each pair of the plurality of cameras having overlapping fields of views;
determining an average value of the set of registration errors; and
simultaneously adjusting homography matrix values of each camera of the set of cameras stored in the memory by the determined average value.

15. The surround view system according to claim 14, wherein:
the plurality of cameras comprises a set of cameras disposed at a corresponding set of corners of an associated vehicle.

16. The surround view system according to claim 14, wherein:
the plurality of cameras comprises at least one camera disposed at each corner of the associated vehicle.

17. A method of calibrating a plurality of cameras disposed in an environment wherein each of the plurality of cameras respectively has a field of view projected onto an area adjacent the camera wherein each field of view overlaps at least one other field of view defining a continuous field of view overlap area completely surrounding a selected target area, the method comprising:
determining a set of image registration errors in respective images of each pair of a plurality of cameras having overlapping fields of view;
determining an average value of the set of registration errors; and
simultaneously adjusting homography matrix values of each camera of the set of cameras by the determined average value.

18. The method of calibrating a plurality of cameras according to claim 17, wherein the determining the adjustment value based on the set of registration errors comprises determining the adjustment value as an average of the image registration errors in the respective images of each pair of a plurality of cameras.

* * * * *